US010825253B2

(12) United States Patent
Rhodes et al.

(10) Patent No.: US 10,825,253 B2
(45) Date of Patent: *Nov. 3, 2020

(54) GENERATING AUGMENTED REALITY OBJECTS ON REAL-WORLD SURFACES USING A DIGITAL WRITING DEVICE

(71) Applicant: Adobe Inc., San Jose, CA (US)

(72) Inventors: Tenell Rhodes, Campbell, CA (US); Gavin S. P. Miller, Los Altos, CA (US); Duygu Ceylan Aksit, Mountain View, CA (US); Daichi Ito, Los Gatos, CA (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,549

(22) Filed: Apr. 4, 2019

(65) Prior Publication Data

US 2019/0236845 A1 Aug. 1, 2019

Related U.S. Application Data

(63) Continuation of application No. 15/716,450, filed on Sep. 26, 2017, now Pat. No. 10,297,088.

(51) Int. Cl.
*G06T 19/00* (2011.01)
*G06F 3/0354* (2013.01)
(Continued)

(52) U.S. Cl.
CPC .......... *G06T 19/006* (2013.01); *G06F 3/0383* (2013.01); *G06F 3/03545* (2013.01); *G06F 3/0304* (2013.01); *G06F 3/0346* (2013.01)

(58) Field of Classification Search
CPC . G06T 19/006; G06F 3/03545; G06F 3/0383; G06F 3/0304; G06F 3/0346
See application file for complete search history.

(56) References Cited

U.S. PATENT DOCUMENTS

| 10,297,088 B2 * | 5/2019 | Rhodes | ............... G06F 3/03545 |
| 2011/0205242 A1 * | 8/2011 | Friesen | .................. G06T 11/60 345/633 |

(Continued)

OTHER PUBLICATIONS

U.S. Appl. No. 15/716,450, Apr. 30, 2018, Preinterview 1st Office Action.

(Continued)

*Primary Examiner* — Chong Wu
(74) *Attorney, Agent, or Firm* — Keller Jolley Preece

(57) ABSTRACT

The present disclosure includes systems, methods, computer readable media, and devices that can generate accurate augmented reality objects based on tracking a writing device in relation to a real-world surface. In particular, the systems and methods described herein can detect an initial location of a writing device, and further track movement of the writing device on a real-world surface based on one or more sensory inputs. For example, disclosed systems and methods can generate an augmented reality object based on pressure detected at a tip of a writing device, based on orientation of the writing device, based on motion detector elements of the writing device (e.g., reflective materials, emitters, or object tracking shapes), and/or optical sensors. The systems and methods further render augmented reality objects within an augmented reality environment that appear on the real-world surface based on tracking the movement of the writing device.

20 Claims, 15 Drawing Sheets

(51) Int. Cl.
*G06F 3/038* (2013.01)
*G06F 3/03* (2006.01)
*G06F 3/0346* (2013.01)

(56) References Cited

U.S. PATENT DOCUMENTS

| | | |
|---|---|---|
| 2013/0127980 A1 | 5/2013 | Haddick |
| 2013/0128022 A1 | 5/2013 | Bose et al. |
| 2016/0131912 A1* | 5/2016 | Border ............... G02B 27/0018 345/8 |
| 2016/0140729 A1* | 5/2016 | Soatto ................ G06K 9/00664 348/135 |
| 2016/0313798 A1 | 10/2016 | Connor |
| 2017/0371432 A1* | 12/2017 | Gavriliuc ............ G06F 3/03545 |
| 2018/0107269 A1* | 4/2018 | Benzies ................ G06T 17/05 |
| 2019/0096129 A1 | 3/2019 | Rhodes et al. |

OTHER PUBLICATIONS

U.S. Appl. No. 15/716,450, Sep. 7, 2018, Office Action.
U.S. Appl. No. 15/716,450, Jan. 22, 2019, Notice of Allowance.

\* cited by examiner

|  | Reflective Element | Emitter | Optical Sensor | Object Recognition | IMU | Machine Learning |
|---|---|---|---|---|---|---|
| Fast Movement |  |  | X |  | X | X |
| Slow Movement | X | X | X | X |  | X |
| Initial Position | X | X |  | X |  |  |
| Tilt | X |  |  | X | X |  |
| Bad Lighting | X |  | X |  | X |  |
| Good Lighting | X | X |  |  |  |  |
| Reflective Surface |  | X | X | X | X | X |
| Non-Reflective Surface | X |  | X |  |  | X |
| Blocked View |  |  |  |  | X | X |

Fig. 5

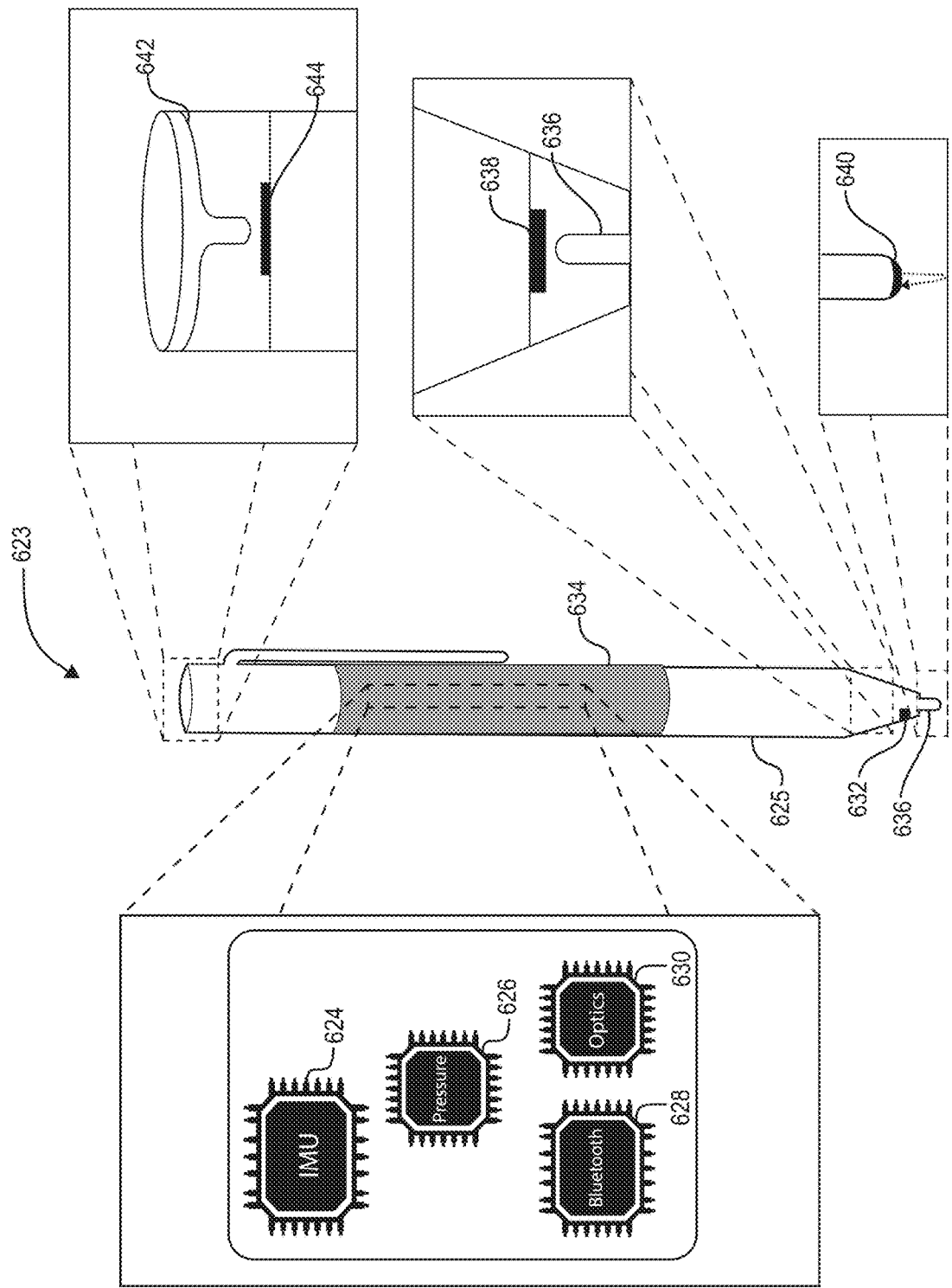

GENERATING AUGMENTED REALITY OBJECTS ON REAL-WORLD SURFACES USING A DIGITAL WRITING DEVICE

CROSS REFERENCE TO RELATED APPLICATIONS

This application is a continuation of U.S. patent application Ser. No. 15/716,450, filed Sep. 26, 2017, which is hereby incorporated by reference in its entirety.

BACKGROUND

Recent years have seen rapid development in systems and devices for generating drawings within a digital workspace. Indeed, developers have generated digital composition systems that can gather user input and generate digital representations to allow users to create digital drawings. For example, some digital composition systems utilize a device with a touchscreen to track user input and generate a drawing on the touchscreen.

Although such conventional digital composition systems can create drawings within a digital workspace, they have a number of significant shortcomings. For example, conventional digital composition systems require a specific device and drawing surface, such as a touchscreen, on which a user must draw or write. Some of these conventional digital composition systems also require specific devices to, for example, compose in different colors. Accordingly, these conventional composition systems require users to transport devices with drawing surfaces, along with multiple writing implements, in order to create digital drawings. These systems thus restrict where (e.g., on what surface) a user can compose and further restrict the size of the composition space to the dimensions of the given drawing surface. Furthermore, drawing surfaces, such as touchscreens, are often difficult to utilize because of a lack of visibility caused by environmental factors, such as glare, darkness, or excessive light.

Some systems have sought to correct these shortcomings by utilizing augmented reality technology. For example, conventional augmented reality systems can track general movement of a hand, finger, or large handheld controller to generate rough digital shapes. While these conventional augmented reality systems can create rough digital representations, they are imprecise and inaccurate. In particular, conventional digital composition systems that utilize augmented reality technology are inexact and struggle to track and represent detailed movements in a digital object. As a result of this inaccuracy, conventional digital composition systems prevent users from drawing or writing with any appreciable aesthetic detail.

Thus, there are several disadvantages with regard to conventional digital composition systems.

SUMMARY

One or more embodiments described herein provide benefits and solve one or more of the foregoing or other problems in the art with systems, methods, non-transitory computer-readable media, and devices for generating digital objects in an augmented reality environment by tracking a writing device in relation to a real-world surface. In particular, the systems described herein can detect (e.g., via a novel digital writing device) a user drawing on an existing surface in a real-world environment (e.g., a table, desk, or wall), generate an augmented reality object based on the detected drawing, and project the augmented reality object onto the existing surface within an augmented reality environment (e.g., such that it appears to the user that they are drawing on the table, desk, or wall). The disclosed systems can thus provide an accurate, sensitive tool for generating drawings that appear to be located on a variety of surfaces within a real-world environment and without the need for a device that includes a separate drawing surface for receiving, monitoring, and/or tracking user input.

For instance, in one or more embodiments, the disclosed systems include a writing device that utilizes sensors and other components to accurately and precisely track interactions between a user, writing device, and writing surface, thereby enabling the system to render augmented reality objects (e.g., using an augmented reality device) at a high level of detail. To illustrate, a user may use the writing device to draw on a table or other surface, and, in response, the system described herein may detect the contact of the writing device with the table (e.g., by way of a pressure sensor) and may track the motion of the writing device by way of a motion detector. The system may further analyze the real-world movement of the writing device and generate a digital object based on the real-world movement. Further, the disclosed systems can render the digital object by way of the augmented reality device such that the digital object appears on the table or other surface.

The disclosed systems, methods, computer-readable media, and devices provide a number of improvements over conventional digital composition systems. As an initial matter, the disclosed systems can generate augmented reality objects without the need for a digital writing surface. Thus, in one or more embodiments, the disclosed systems can expand available creative space (by removing boundaries inherent to touchscreens or other existing writing surfaces) while also freeing users from the need to transport large devices that include built-in writing surfaces. Furthermore, the disclosed systems can provide accurate and highly detailed renderings of user compositions. Indeed, the disclosed system can track changes in pressure, tilt, orientation, location and movement of a writing device in relation to a real-world surface and generate augmented reality objects that reflect detailed nuances of expressive strokes, shading, and styles. In addition, the disclosed systems can generate augmented reality objects within an augmented reality object that are easily visible, regardless of surrounding environmental factors (e.g., by dimming surrounding environmental distractions or emphasizing augmented reality objects). Furthermore, the disclosed systems can improve performance of implementing computing systems by selecting (and excluding) techniques for tracking a writing device in response to circumstances unique to a particular real-world environment Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 5 illustrates an example table of approaches for tracking a writing device in accordance with one or more embodiments;

FIG. 6B illustrates an example writing device including one or more components in accordance with one or more embodiments;

DETAILED DESCRIPTION

Figure 1:
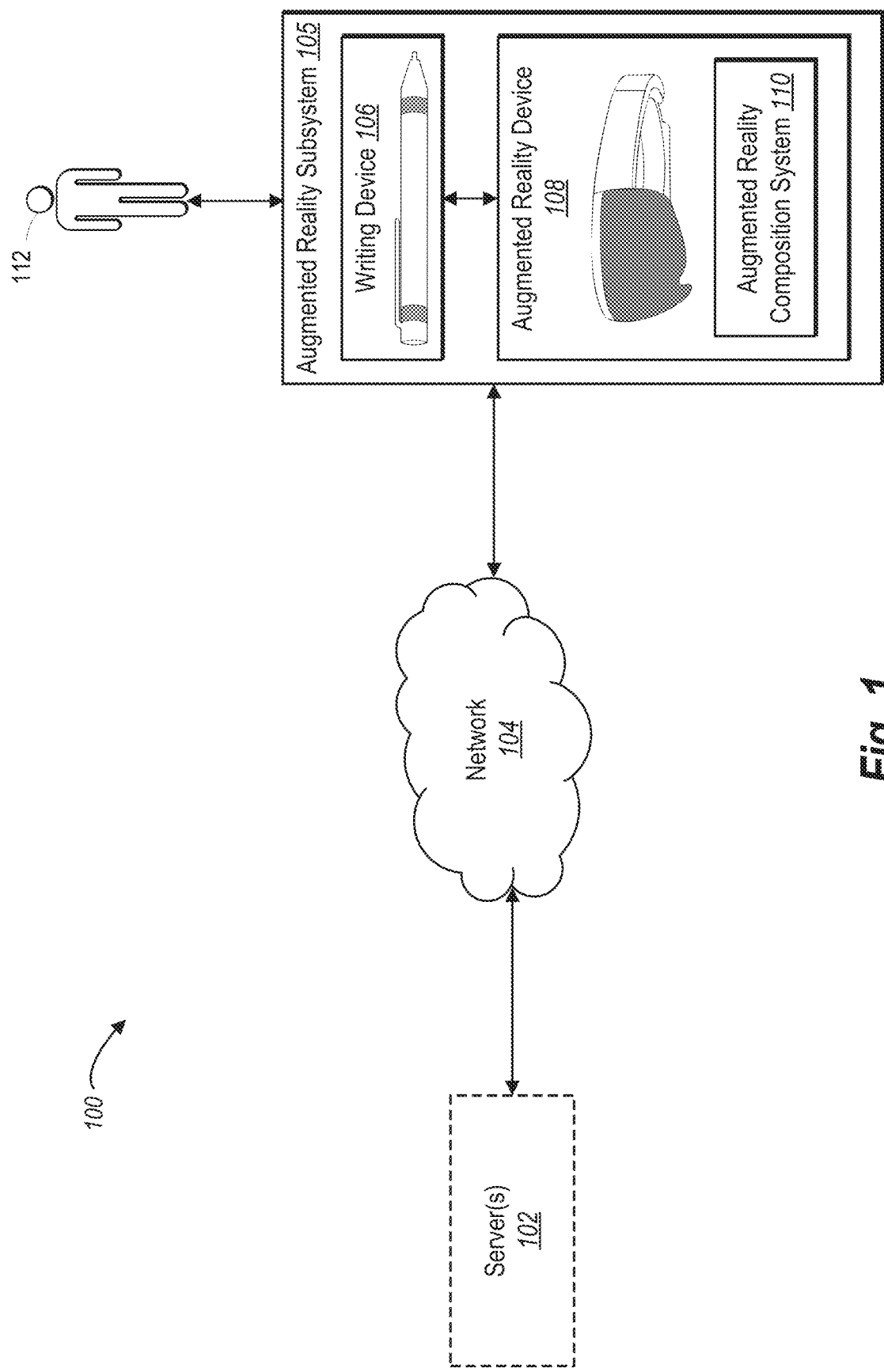
FIG. 1 illustrates an example schematic diagram of an example environment of an augmented reality composition system in accordance with one or more embodiments.

One or more embodiments described herein provide benefits and solve one or more of the foregoing or other problems in the art with an augmented reality composition system that generates digital objects in an augmented reality environment by accurately tracking a writing device in relation to a real-world surface. In particular, the augmented reality composition system can accurately detect interaction between a writing device and a real-world surface that reflects drawing (or writing) on the real-world surface. In response, the augmented reality composition system can generate an augmented reality object in real-time that corresponds to the user input (e.g., the movement of the writing device) within a three-dimensional augmented reality environment. Moreover, the augmented reality composition system can portray the augmented reality object on the real-world surface (e.g., via an augmented reality device) such that it appears to the user that drawing lies on the real-world surface.

To illustrate, the augmented reality composition system can detect an initial contact of a writing device with a real-world surface. For example, the augmented reality composition system can detect the initial contact by way of a pressure sensor connected to a tip of the writing device. Additionally, the augmented reality composition system can determine an initial location of the writing device in response to detecting the initial contact of the writing device with the real-world surface. For instance, the augmented reality composition system can determine the initial location via a locator element (e.g., laser emitter or infrared reflective element) affixed to the writing device. Furthermore, the augmented reality composition system can detect movement (e.g., real-world movement) of the writing device relative to the initial location by way of a motion detector element (e.g., optical sensor that detects light deflections) associated with the writing device. Based on the detected movement of the writing device, the augmented reality composition system can render an augmented reality object that, when observed by way of an augmented reality device, appears to be located on the real-world surface.

As just mentioned, the augmented reality composition system can generate digital objects within an augmented reality environment. More particularly, the augmented reality composition system can track pressure, orientation, location, and movement of a writing device and render augmented reality objects. To generate an augmented reality environment and augmented reality objects consistent with a real-world environment, the augmented reality composition system can utilize a three-dimensional modeling algorithm. For example, in one or more embodiments, the augmented reality composition system utilizes a three-dimensional modeling algorithm that combines depth information together with color data (e.g., Red Green Blue ("RGB") data) to generate a three-dimensional model of a real-world environment.

In addition, the augmented reality composition system can utilize a number of techniques to track the initial location and movement of the writing device (or more precisely movement of a tip of the writing device). For example, the augmented reality composition system can perform object recognition techniques to track the shape of the writing device as it moves in the real world. Moreover, the augmented reality composition system can track the writing device by identifying an indicator such as, for example, a laser emitted by the writing device and projected onto the real-world surface. Similarly, the augmented reality composition system can track the writing device by detecting movement and/or orientation of a material that reflects a particular wavelength of light (e.g., infrared tape). Furthermore, the augmented reality composition system can track the writing device by way of a motion detector, such as an inertial measurement unit ("IMU") on the writing device, or by an optical sensor that detects light deflection off of real-world surfaces as the writing device.

Utilizing various sensors and components, the augmented reality composition system can generate augmented reality objects that reflect nuanced strokes, shading, drawing, or other marks. For example, the writing device can include a pressure sensor that is configured to detect contact of the writing device on a surface. The pressure sensor may further be configured to detect variations in pressure applied to the writing device (e.g., the tip of the writing device). In addition, the writing device can include a locator element that detects variations in orientation (i.e., tilt) of the writing device. Based on variations in pressure, tilt, and/or orientation, the augmented reality composition system can vary digital marks. To illustrate, the augmented reality composition system can modify weight or thickness of the digital mark to allow for broad shading or more detailed, defined lines based on variations in pressure and/or orientation.

The augmented reality composition system can also include various features allowing a user to modify, manipulate, or share augmented reality objects. For instance, because the augmented reality composition system generates an augmented reality environment based on a three-dimensional analysis of real-world surroundings, the augmented reality composition system can further change three-dimensional coordinates of an augmented reality object (e.g., render a moving animation of the drawing that follows the movement of the writing device through the air). Similarly, the augmented reality composition system can render interactive digital objects, such as a digital color palette or a digital menu, within an augmented reality environment and detect user interaction with the digital objects via the writing device. Furthermore, the augmented reality composition system can transfer an augmented reality object from one augmented reality device to another (e.g., by pushing, throwing, or otherwise moving the augmented reality object in the direction of the other user).

The augmented reality composition system provides various benefits over conventional composition systems and conventional virtual reality ("VR") composition systems. For example, the augmented reality composition system is more precise and accurate than conventional VR composition systems. By using various sensitive tracking techniques, the augmented reality composition system can accurately track interactions between a writing device and real-world surface. Indeed, the augmented reality composition system can detect even slight movement, tilt, pressure, and other sensory information related to the writing device. By analyzing these various factors in isolation and/or in conjunction with one another, the augmented reality composition system can more accurately interpret how a user moves, pushes on, lifts up, or otherwise manipulates a writing device and generate more precise augmented reality objects (e.g., that realistically mimic writing or drawing on a real-surface).

Furthermore, the augmented reality composition system provides increased flexibility. In particular, where some conventional systems require a user to write on a specific medium (e.g., a touchscreen), in one or more embodiments, the augmented reality composition system enables a user to write or draw on virtually any surface. To illustrate, the augmented reality composition system analyzes real-world surfaces and provides indications to the user of which surfaces are acceptable for composing, whereupon the user can freely write on an acceptable surface. Accordingly, users no longer need to purchase and transport devices with writing surfaces and are not limited by the boundaries of such writing surfaces.

Additionally, the augmented reality composition system enables a user to move an augmented reality composition from one surface to another. To illustrate, the augmented reality composition system can save an augmented reality object that the user composes on a first real-world surface and, in response to detecting user input to load the saved augmented reality object onto a different real-world surface (e.g., in a different room), the augmented reality composition system loads the augmented reality object onto the new real-world surface. Thus, the augmented reality composition system enables the user to edit and continue working on augmented reality compositions wherever the user is located.

The augmented reality composition system can also improve visibility while composing on a real-world surface. For example, in one or more embodiments, the augmented reality composition system can further highlight augmented reality objects composed by the user. To illustrate, the augmented reality composition system can increase the brightness of an augmented reality object to help the augmented reality object stand out against a background. Similarly, the augmented reality composition system can dim a surrounding area to emphasize a user's workspace. For example, the augmented reality composition system can dim the areas outside of the real-world surface on which the user is currently composing. Alternatively, the augmented reality composition system can project augmented reality objects (e.g., computer-generated digital objects or user-created digital objects such as digital photographs) such as a white sheet on a real-world surface to improve visibility.

As still another advantage of the augmented reality composition system over conventional systems, the augmented reality composition system gives users a more organic composition experience. Whereas some conventional systems are limited by digital screens and writing surfaces, the augmented reality composition system described herein mimics different textures and colors of real art supplies such as paint, pen, pencil, etc. For example, by utilizing an immersive, three-dimensional augmented reality environment, the augmented reality composition system provides more realistic approximations of actual colors and textures of various art supplies.

Furthermore, the augmented reality composition system can utilize computing resources more efficiently than conventional composition systems. For example, in one or more embodiments, the augmented reality composition system analyzes real-world surroundings or circumstances and selects techniques based on the detected circumstances. By selecting particular techniques (and omitting other analysis techniques), the augmented reality composition system can more intelligently utilize system resources. To illustrate, the augmented reality composition system can determine particular techniques most suited to tracking a writing device in poor lighting conditions. In response to detecting poor lighting conditions, the augmented reality composition system can utilize those particular techniques (and omit other techniques) to track the writing device.

More detail regarding the augmented reality composition system will now be provided with reference to the figures. For example, FIG. 1 illustrates a schematic diagram of an example environment 100 for implementing an augmented reality composition system 110 in accordance with one or more embodiments. An overview of the environment 100 is described in relation to FIG. 1. Thereafter, a more detailed description of the components and processes of the augmented reality composition system 110 is provided in relation to the subsequent figures.

As mentioned, FIG. 1 illustrates the environment 100 including server(s) 102, a network 104, an augmented reality subsystem 105, and a user 112. The augmented reality subsystem 105 further includes a writing device 106 and an augmented reality device 108. The network 104 may be any suitable network over which computing devices can communicate. Additional detail regarding the network 104 is provided below in relation to FIG. 9.

As just discussed, the environment 100 includes an augmented reality subsystem 105 that includes the augmented reality device 108. As used herein, the term "augmented reality device" refers to a computing device that provides a modified view of the real world (i.e., provides an overlay of digital content over a real world view). In particular, the term "augmented reality device" includes a computing device that digitally augments a contemporaneous view of the real-world with computer-generated sensory input, such as sound, images, video, graphics, or data. For example, an augmented reality device includes an augmented reality headset or augmented reality glasses that include one or more lenses or display screens that permit a user to view the real word together with augmented reality objects. An augmented reality device can also include a camera, microphone, or other data capturing devices capable of capturing environmental data. For example, an augmented reality device can utilize a camera to capture environmental data to enable the augmented reality device to properly overlay augmented reality objects in relation to a real-world view.

To illustrate, in relation to the embodiment of FIG. 1, the augmented reality device 108 includes an augmented reality headset (such as MICROSOFT HOLOLENS, MAGIC LEAP, SONY SMARTEYEGLASS, GOOGLE GLASS, EPSON BT-350, META2 or others). In other embodiments, the user client device may refer to a different type of augmented reality device, such as a mobile device or smartphone. Regardless of the particular type of device, in relation to FIG. 1, the augmented reality device 108 is associated with the user 112 and capable of interfacing with the writing device 106 and rendering augmented reality objects in response to tracking the writing device 106.

Although not illustrated, in one or more embodiments, the augmented reality device 108 comprises multiple computing devices. For example, the augmented reality device 108 can include (e.g., interface with) a client computing device such as a tablet, smartphone, personal computer, or other computing device. To illustrate, the augmented reality device 108 can provide augmented reality objects for display, while the client computing device performs various calculations or processes to generate the augmented reality objects and/or communicate with other components of the environment 100.

As used herein, the term "augmented reality object" refers to a digital item produced by an augmented reality device that modifies perception (e.g., a view) of the real world. An augmented reality object includes digital images, digital videos, and/or sound provided by an augmented reality device as an overlay to a real-world environment. An augmented reality object also includes a digital mark generated by the augmented reality composition system 110. As used herein, the term "digital mark" refers to an augmented reality object corresponding to interaction with a writing object. In particular, the term "digital mark" includes an augmented reality object that reflects interaction between a user, writing device, and/or a real-world surface. To illustrate, the term "digital mark" includes a pixel, line, shape, drawing, character, letter, word, or image provided by an augmented reality device. For example, the augmented reality composition system 110 can generate a digital mark in an augmented reality environment and provide the digital mark for display via the augmented reality device 108 such that it appears (to the user 112) that the digital mark is located on a real-world surface based on the writing device 106 pressing and dragging on the real-world surface.

As used herein, the term "augmented reality environment" refers to a representation of augmented reality objects relative to real-world surroundings. In particular, the term augmented reality environment includes a three-dimensional representation of augmented reality objects in relation to three-dimensional coordinates corresponding to a real-world environment. The augmented reality composition system 110 can provide an augmented reality environment for display via an augmented reality device (e.g., by mapping three-dimensional coordinates to a display of the augmented reality device). For instance, the augmented reality composition system can render augmented reality objects on a display of the augmented reality device such that the augmented reality objects appear to be located at the corresponding three-dimensional coordinates of the real-world environment.

As used herein, the term "real-world surface" refers to a face of an object. In particular, the term "real-world surface" may refer to a rounded surface, a planar surface, a rough surface, or a smooth surface. In some embodiments, the term "real-world surface" refers to a curved surface such as the side of a pillar or column. In other embodiments, the term "real-world surface" refers to a plane of a physical object in a real-world environment. For example, the term "real-world surface" includes a top of a table, a wall, a door, a shelf, or another surface in the real world. In some embodiments, a real-world surface may refer to a surface that the augmented reality composition system 110 determines as acceptable for composing (e.g., a surface that is sufficiently flat within a drawing threshold).

As used herein, the term "writing device" refers to an implement configured to generate digital marks. In particular, the term "writing device" includes a cylindrical implement capable of being held by a user (e.g., in the shape of a pen or pencil) for generating digital marks. For example, in relation to FIG. 1, the writing device 106 may refer to a stylus-shaped device that includes various components therein such as, for example, a pressure sensor, a light (e.g., laser) emitter, an optical sensor, an IMU, or other sensory components.

The writing device 106 includes various components to assist the augmented reality composition system 110 to track pressure, orientation, location, and/or movement of the writing device 106. For example, the writing device 106 can include a pressure sensor, a locator element, a motion detector element, and/or an inertial measurement unit. As used herein, a "locator element" refers to a component integrated as part of (or otherwise associated with a writing device) that allows the augmented reality composition system 110 to determine a position of the writing device. As an example, a locator element includes a reflective element (e.g., infrared tape) on the writing device 106 that is configured to reflect a particular range of light wavelengths and that is recognizable by the augmented reality device 108 (e.g., recognizable for determining location of the writing device 106. A locator element also includes an emitter configured to project a visual indicator (e.g., a laser or other light) onto a real-world surface, where the visual indicator is recognizable by the augmented reality device 108. In the same or other embodiments, a locator element may refer to a BLUETOOTH locator configured to transmit waves within a particular range of frequencies whereby the augmented reality device 108 may determine the location of the writing device 106. In one or more embodiments, BLUETOOTH is utilized only for communication between the augmented reality device 108 and the writing device 106.

Similarly, as used herein, the term "motion detector element" refers to a component of a writing device that is configured to track movement. In particular, a motion detector element includes a component integrated in the writing device that allows the augmented reality composition system 110 to determine movement (e.g., translation) of the writing device 106 (or a tip of the writing device 106) over time. A motion detector element may further determine rotation and/or tilt of the writing device 106. The motion detector element can include one or more locator elements. For example, a motion detector element can include an emitter that projects a visual indicator, a reflective element, or an optical sensor, as described in greater detail below.

As used herein, an "inertial measurement unit" or "IMU" refers to a device that measures and reports information regarding changes in orientation and/or location. In particular, an inertial measurement unit includes a device that measures and reports specific force, angular rate, and/or magnetic field information using a combination of one or more accelerometers, gyroscopes, and/or magnetometers. To illustrate, an IMU can detect angular changes in pitch, roll, yaw as well as linear position changes.

Moreover, as used herein, the term "pressure sensor" may refer to device that measures a force (or force per unit area) applied to the writing device. In particular, a pressure sensor includes a device that measures pressure applied to a tip of the writing device. For example, a pressure sensor may refer to a type of force collector such as a piezoresistive strain gauge, a capacitive pressure sensor, an electromagnetic pressure sensor, a piezoelectric pressure sensor, an optical pressure sensor, or a potentiometric pressure sensor. A pressure sensor may detect an initial contact with a real-world surface, and may further detect variations in the force (and/or force per unit area) applied to the writing device 106 on the real-world surface. Additional detail regarding the writing device 106 and its components is provided below with reference to FIGS. 6A-6B.

As mentioned, the writing device 106 can communicate with the augmented reality device 108. For example, the writing device 106 may include a transceiver device such as a BLUETOOTH device, a ZIGBEE device, or a WIFI device operable to facilitate communications between the writing device 106 and the augmented reality device 108, bypassing network 104. Likewise, the augmented reality device 108 may also include a BLUETOOTH device, a ZIGBEE device, a WIFI device, or other transceiver component operable to communicate with the writing device 106 in a similar fashion. For example, the writing device 106 communicates with the augmented reality device 108, and vice-versa, to transmit and receive information relating to pressure sensor data, optical sensor data, object recognition data, emitter data, IMU data, etc., as will be described in further detail below with reference to the subsequent figures.

As shown in FIG. 1, the environment may also include the server(s) 102. The server(s) 102 may generate, store, receive, and transmit any type of data utilized by the augmented reality composition system 110. In one example embodiment, the server(s) 102 comprise content servers. The server(s) 102 can also comprise a communication server or a web-hosting server. For instance, in embodiments where the environment 100 includes the server(s) 102, the augmented reality composition system 110 may be implemented in whole or in part by the server(s) 102. In addition, the server(s) 102 may communicate with the augmented reality subsystem 105 via the network 104 using an appropriate communications protocol. In particular, the server(s) 102 may communicate via the network 104 with the writing device 106 to send and/or receive information relating to motion tracking, sensory input, etc. Likewise, the server(s) 102 may communicate with the augmented reality device 108 to share all or part of the processing required to implement the augmented reality composition system 110 or else to transmit information received from the writing device 106 relating to sensory input and/or motion tracking information. However, in some embodiments, the environment 100 may not include the sever(s) 102, and the augmented reality composition system 110 may be implemented within the augmented reality subsystem 105—i.e., across one or both of the writing device 106 and/or the augmented reality device 108, without the server(s) 102.

As illustrated by FIG. 1, the augmented reality composition system 110 may, in one or more embodiments, be included on the augmented reality device 108. Moreover, in one or more embodiments, the augmented reality composition system 110 may be implemented by the augmented reality device 108 in conjunction with one or more other components of the environment 100.

By way of example, the augmented reality composition system 110 initially analyzes (e.g., via the augmented reality device 108) a real-world environment to detect surfaces and objects within the environment. Based on this analysis, the augmented reality composition system 110 generates (e.g., via the augmented reality device 108) a three-dimensional augmented reality environment that includes three-dimensional reconstructions of surfaces and objects identified within the real-world environment. The augmented reality composition system 110 additionally analyzes (e.g., via the augmented reality device 108) the detected surfaces and objects to identify any surfaces within the real-world environment that are acceptable for composing (e.g., that are sufficiently large and sufficiently flat or planar). Upon identifying one or more surfaces that are acceptable for composing, the augmented reality composition system 110 provides indicators to mark those acceptable surfaces within the user's view of the augmented reality environment. For example, the augmented reality composition system 110 overlays (e.g., via the augmented reality device 108) a green check mark on an acceptable surface that is visible to the user via the augmented reality device.

Continuing the example, the augmented reality composition system 110 detects (e.g., via the writing device 106 and/or the augmented reality device 108) that the user intends to compose on a real-world surface (e.g., a real-world surface that is acceptable for composing) by receiving an input from a pressure sensor on the writing device 106 that indicates that the writing device 106 is touching the real-world surface. Upon detecting the pressure input, the augmented reality composition system 110 determines an initial location of the writing device 106 by way of sensory information determined from the writing device 106 and/or by way of object recognition or other functionalities of the augmented reality device 108. The augmented reality composition system 110 further determines changes in location, orientation, tilt, and pressure of the writing device 106 as the user moves the writing device along the real-world surface to create an augmented reality composition. In response to detecting such changes, the augmented reality composition system 110 renders digital marks in real time to form an augmented reality object for display to the user via the augmented reality device 108. Upon detecting an indication that the user has completed composing an augmented reality object (e.g., by a release of pressure on the writing device 106), the augmented reality composition system 110 enables the user to manipulate the augmented reality object within the three-dimensional augmented reality environment (e.g., via the augmented reality device 108).

As illustrated by the foregoing example, various components of the environment 100 may implement the augmented reality composition system 110. Indeed, the writing device 106 may communicate with the augmented reality device 108 (e.g., directly or via network 104) and may implement all or part of the augmented reality composition system 110. Indeed, in some embodiments, the writing device 106 may include a processor operable to analyze user input and/or process other aspects of the augmented reality composition system 110. In this way, the processing load to implement the augmented reality composition system 110 may be shared across the augmented reality device 108 as well as the writing device 106 and/or the server(s) 102.

Although FIG. 1 illustrates a particular arrangement of the server(s) 102, the network 104, the augmented reality subsystem 105, the writing device 106, and the augmented reality device 108, various additional or alternative arrangements are possible. For example, while FIG. 1 illustrates the writing device 106 and the augmented reality device 108 as part of the augmented reality subsystem 105, where the writing device 106 and the augmented reality device 108 communicate directly, bypassing network 104, in at least one embodiment, the writing device 106 and/or the augmented reality device 108 may be outside the augmented reality subsystem 105 and may communicate via the network 104.

Similarly, although FIG. 1 illustrates the environment 100 including a particular number of components, the environment 100 may include additional or alternative components. For example, the augmented reality composition system 110 may be collaborative, where multiple users may all contribute to the creation of an augmented reality object within a single shared augmented reality environment (e.g., a plurality of users could draw on a table with a writing device and generate a shared augmented reality object). In these embodiments, the environment 100 may include multiple user client devices, and the augmented reality composition system 110 may be implemented by the server(s) 102 or across one or more of the multiple user client devices.

As described above, in one or more embodiments, the augmented reality composition system 110 tracks interactions between a user, a writing device, and/or a real-world surface and generates an augmented reality object within an augmented reality environment. For instance, FIG. 2 illustrates a representation of the augmented reality composition system 110 tracking input by way of the writing device 106 and generating an augmented reality object 204.

Figure 2:
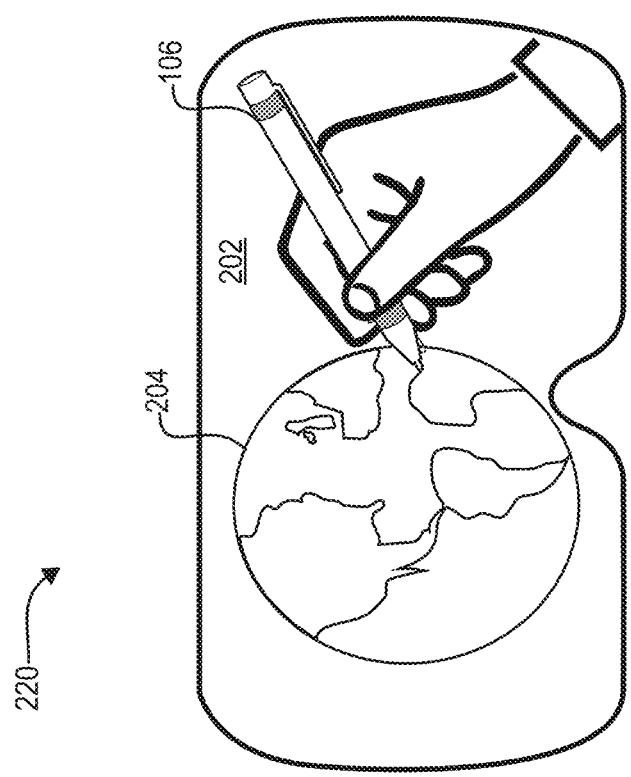
FIG. 2 illustrates an example augmented reality object generated based on tracking interaction with an example writing device on an example real-world surface in accordance with one or more embodiments.
Figure 2:
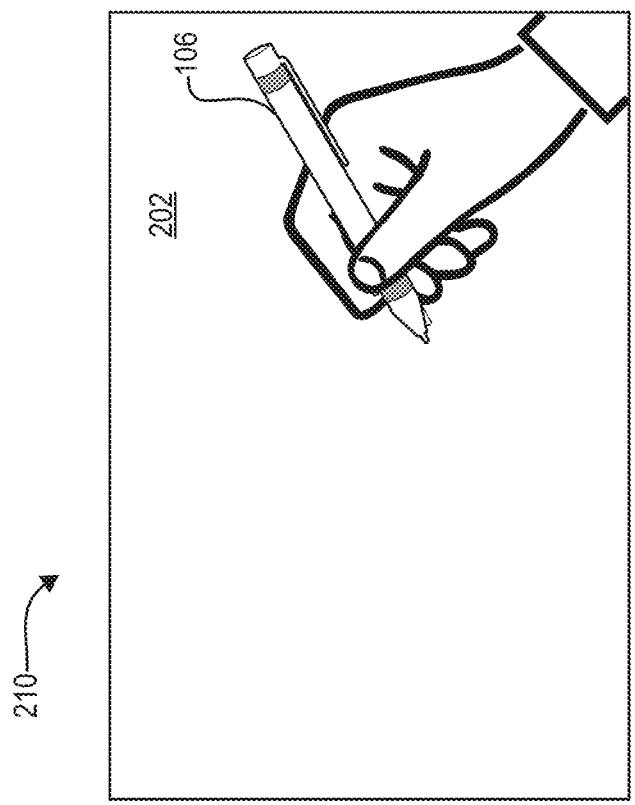

More particularly, FIG. 2 illustrates a first view 210 of a real-world surface 202 and a second view 220 of the real-world surface 202. Specifically, the first view 210 is a representation of the real-world surface 202 viewed without an augmented reality device (i.e. looking at a table without an augmented reality headset), and the second view 220 is a representation of the real-world surface 202 as viewed through an augmented reality device (i.e., looking at the table with the augmented reality headset 108). In both views 210 and 220, a hand (e.g., of the user 112) grips the writing device 106 and moves the writing device 106 to "draw" on the real-world surface 202 (i.e., draw an image of a globe).

As shown, in the first view 210, the real-world surface 202 is empty. Indeed, even though a user presses and drags on the real-world surface 202 with the writing device 106, the real-world surface 202 does not include any writing. In contrast, with the benefit of the augmented reality device 108, the second view 220 includes an augmented reality object 204. In particular, the second view 220 includes the augmented reality object 204, which corresponds to interactions between the writing device 106 and the real-world surface 202.

In relation to the second view 220, the augmented reality composition system 110 generates the augmented reality object 204 within an augmented reality environment and presents the augmented reality object 204 to the user 112 via the augmented reality device 108. Specifically, the augmented reality composition system 110 tracks pressure, location, orientation, and movement of the writing device 106 as the user 112 moves the writing device 106 along the real-world surface 202.

As shown in the second view 220, as the user 112 moves the writing device 106 on the real-world surface 202, the augmented reality composition system 110 tracks the orientation, pressure, and/or location of the writing device 106 and generates digital marks within an augmented reality environment. Accordingly, as the user 112 moves the writing device 106 to draw the shape of the globe, the augmented reality composition system 110 generates the augmented reality object 204. Indeed, as illustrated in FIG. 2, the user 112 is currently drawing a border. The augmented reality composition system 110 renders the augmented reality object 204 to appear to the user 112 as though the generated digital mark of the border is coming out of the tip of the writing device 106—i.e., the augmented reality composition system 110 renders the digital marks near the tip of the writing device 106 in real time or near real time as the user moves the writing device 106 on the real-world surface 202.

As shown in the second view 220, the augmented reality composition system 110 further renders the augmented reality object 204 as though it is drawn on the real-world surface 202. To elaborate, the augmented reality composition system 110 analyzes a view of real-world surroundings of the user 112 (e.g., that the user 112 observes through the augmented reality device 108) to identify the real-world surface 202. The augmented reality composition system 110 further analyzes the real-world surface 202 to identify the slope, size, and other attributes of the real-world surface 202. Based on this analysis, the augmented reality composition system 110 renders the augmented reality object 204 on the second view 220 of the real-world surface 202 that the user 112 observes by way of the augmented reality device 108 (e.g., to follow the slope, etc. of the real-world surface).

In addition, the augmented reality composition system 110 renders the augmented reality object 204 to mimic art supplies or other real-world drawing implements such as pens, pencils, paints, crayons, etc. In particular, the augmented reality composition system 110 provides options for the user 112 to select various colors, textures, or other features of the digital marks that appear to come from the tip of the writing device 106. Accordingly, the augmented reality composition system 110 can render pen ink digital marks or paint-like digital marks (e.g., in response to user selection of a pen or paint setting). Likewise, the augmented reality composition system 110 can also render digital marks in various colors such as red, blue, green, yellow, etc.

Furthermore, though not illustrated in FIG. 2, the augmented reality composition system 110 enables a user 112 to interact with the augmented reality object 204. In particular, the augmented reality composition system 110 may enable the user 112 to touch, move, resize, adjust, warp, or otherwise manipulate the augmented reality object 204 by way of the writing device 106. Furthermore, the user 112 may manipulate the augmented reality object 204 in three dimensions—i.e., the augmented reality composition system 110 enables the user 112 to move the augmented reality object 204 off of the real-world surface 202 and rotate or otherwise move it in three-dimensional space. Thus, the augmented reality composition system 110 provides an interactive interface by which the user 112 is more immersed in the composition experience.

Notably, without the augmented reality composition system 100, the real-world surface 202 appears unchanged. Indeed, as shown in the first view 210, the real-world surface 202 does not itself contain any marks. Thus, the user 112 is not dependent on the particular real-world surface 202 to generate the augmented reality object 204. In fact, the user 112 can move to a new location with a new surface and utilize the new surface to continue drawing the augmented reality object 204. Specifically, the augmented reality composition system can identify a new real-world surface and project the augmented reality object to the new real-world surface. Thus, the user is not tied to any particular location or drawing surface, but can create or modify augmented reality objects in nearly any locale.

Although not illustrated in FIG. 2, in some embodiments the augmented reality composition system 110 renders computer-generated digital objects such as a color palette or a menu on the real-world surface 202. In particular, the augmented reality composition system 110 generates a color palette and renders the color palette in a location on the real-world surface 202 chosen by the user 112 or else by the augmented reality composition system 110. Indeed, the augmented reality composition system 110 may relocate the color palette based on user input such as, for example, a tap-and-drag motion by way of the writing device 106.

The augmented reality composition system 110 further detects a selection of a color from the color palette by way of the writing device 106. For example, the augmented reality composition system 110 detects that the writing device 106 makes contact with the real-world surface 202 at a location where the augmented reality composition system 110 renders a particular color, whereupon the augmented reality composition system 110 changes the color of the output of the writing device 106. As another example, the augmented reality composition system 110 detects (e.g., via a microphone associated with the augmented reality device 108) a voice command from the user 112 to select a color from the color palette.

In addition to a color palette, the augmented reality composition system 110 can further render other interactive (e.g., user selectable) digital objects such as an augmented reality menu. In particular, the augmented reality composition system 110 can render an augmented reality menu on the real-world surface 202 that includes various selectable options for managing settings, user preferences, or other features. For example, the augmented reality composition system 110 can provide a selectable option to save or load an augmented reality object (e.g., load an augmented reality object onto a new reference surface). The augmented reality composition system can detect a selection by the user 112 of a menu item within the augmented reality menu, whereupon the augmented reality composition system 110 performs the necessary processes to carry out the selected menu request. Alternatively, the augmented reality composition system 110 detects a voice command to selected a menu option by way of a microphone on the augmented reality device 108.

As mentioned above, the augmented reality composition system 110 is further capable of increasing visibility of the augmented reality object 204. In particular, in some embodiments the augmented reality composition system 110 increases the brightness, hue, contrast, or other attribute of the augmented reality object 204 to make the augmented reality object 204 easier for the user 112 to see. In other embodiments, the augmented reality composition system 110 dims an area around the augmented reality object 204 by decreasing brightness and/or by changing hue and contrast. For example, the augmented reality composition system 110 dims the areas of the real-world surface 202 that do not include part of the augmented reality object 204. As another example, the augmented reality composition system 110 dims a periphery of the augmented reality device 108 so that areas in the center of the view through the augmented reality device 108 are bright and clear while areas away from the center near the edges of the view through the augmented reality device 108 are less clear or vibrant.

As mentioned, the augmented reality composition system 110 can also project computer-generated digital objects into the view of the user 112. For example, the augmented reality composition system 110 can render a digital image onto the real-world surface 202. To illustrate, the augmented reality composition system 110 can project a digital image of a car as an augmented reality object onto a real-world surface. The user 112 can then utilize the projection of the digital image as part of a larger composition (e.g., to trace the car or to draw a person sitting in the car).

In some embodiments, the augmented reality composition system 110 renders digital objects chosen by the user 112. For example, the augmented reality composition system 110 enables the user 112 to select an object (e.g., a digital image) from a menu of the augmented reality composition system 110, or alternatively, the augmented reality composition system 110 loads an augmented reality object that the user 112 previously composed and saved. Similarly, in some embodiments, the augmented reality composition system 110 renders a digital version of a picture taken and saved by the user 112 by way of the augmented reality device 108 or else taken by another device and uploaded to the augmented reality composition system 110. Thus, by projecting digital objects in this way, the augmented reality composition system 110 further provides the user 112 with digital scenery, which may help the user 112 see more clearly and compose more accurately.

Figure 3A:
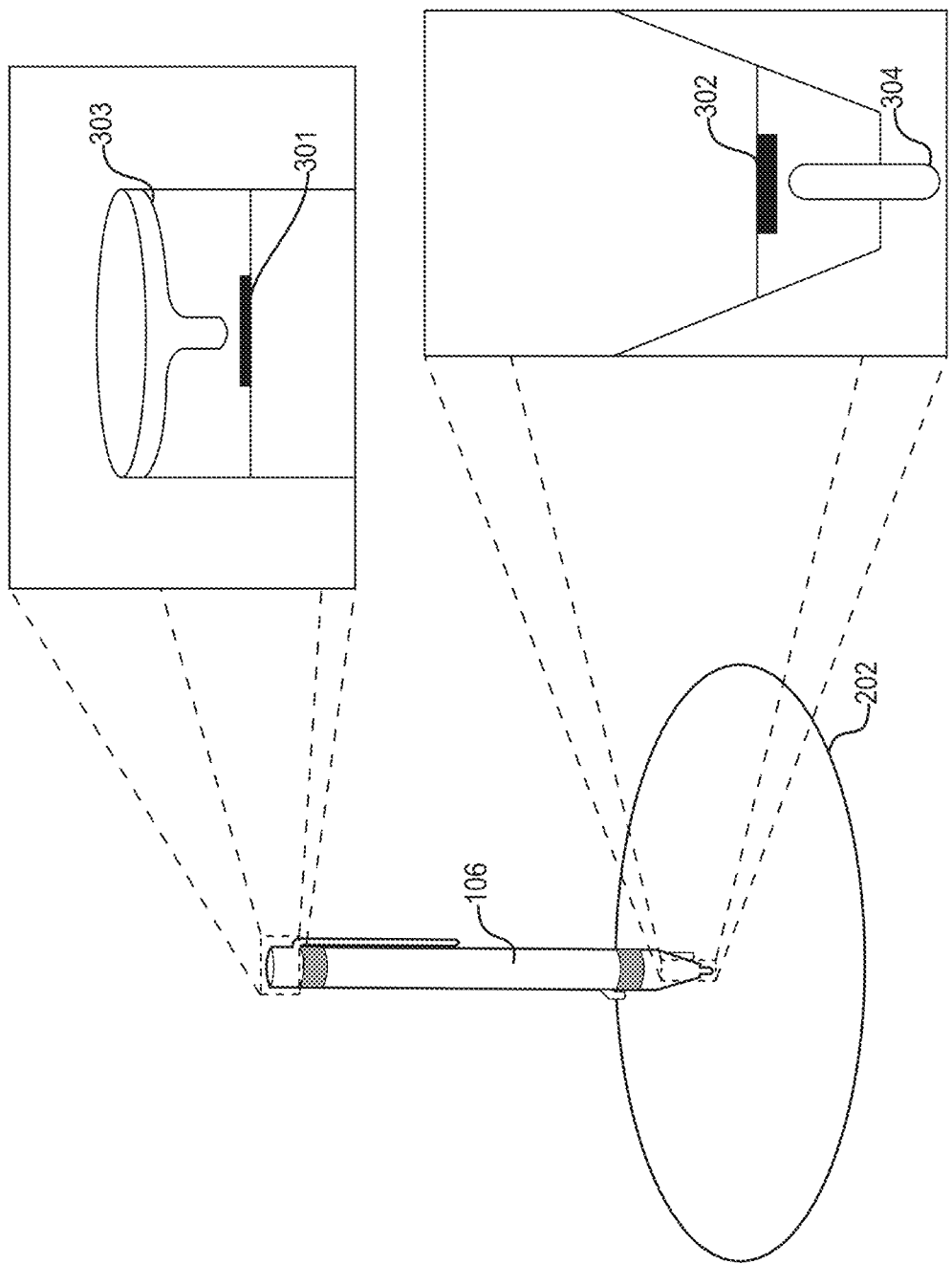
FIG. 3A illustrates an example writing device including example sensors in accordance with one or more embodiments.

As mentioned above, the augmented reality composition system 110 can utilize a pressure sensor to determine interaction with a real-world surface. For example, FIG. 3A illustrates an example writing device 106 in contact with the real-world surface 202. In particular, FIG. 3A illustrates the writing device 106 including a tip 304, a pressure sensor 302, an eraser 303, and an additional pressure sensor 301. Although FIG. 3A illustrates two different pressure sensors 301 and 302 on each respective end of the writing device 106, in some embodiments, the writing device 106 need not include both pressure sensors 301 and 302, but instead includes one or the other of the pressure sensors 301 and 302.

For example, in relation to FIG. 3A the augmented reality composition system 110 detects contact of the writing device 106 with the real-world surface 202 by way of the pressure sensor 302. Indeed, the tip 304 of the writing device 106 is configured to move in response to a force applied to the writing device 106 by the user 112. For example, as the user 112 presses the writing device 106 down on the real-world surface 202, the tip 304 depresses a certain distance into the writing device 106 and contacts the pressure sensor 302. In such embodiments, the augmented reality composition system 110 detects when the tip 304 of the writing device 106 is pushed in to contact the pressure sensor 302. Although FIG. 3 illustrates a particular type of pressure sensor, the augmented reality composition system 110 can utilize any type of pressure sensor described herein. For example, in some embodiments, the augmented reality composition system 110 can detect a change in pressure without movement of the tip 304.

Based on a change in pressure, (e.g., by detecting an initial contact of the tip 304 with the pressure sensor 302), the augmented reality composition system 110 can determine that the user has begun drawing on the real-world surface 202. Furthermore, the augmented reality composition system can determine an initial location for drawing via the writing device 106 (e.g., an initial location of the tip 304). Indeed, as mentioned above, to determine the initial location of the writing device 106, the augmented reality composition system 110 utilizes one or more of a number of techniques, including object recognition techniques or one or more locator elements (e.g., an emitter, reflective material, or other element as described in greater detail below).

In addition to detecting an initial contact of the writing device 106 on the real-world surface 202, the augmented reality composition system 110 further detects an amount of pressure (e.g., a magnitude of the pressure) applied to the writing device 106. Based on changes in the pressure applied to the writing device 106 by the user 112, the augmented reality composition system 110 renders digital marks with different attributes. To illustrate, when the user 112 is pressing hard on the writing device 106, the augmented reality composition system 110 may generate digital marks (e.g., lines) with a heavier weight—i.e., a strength, heaviness, or darkness of lines or marks—or may alternatively generate digital marks with a thicker width. Similarly, when the user 112 is pressing softly on the writing device 106, the augmented reality composition system 110 renders digital marks with a softer weight (e.g., a lighter appearance) or a thinner width.

In some embodiments, the augmented reality composition system 110 detects an initial contact of the writing device 106 and thereafter ignores pressure sensor data relating to different amounts of pressure applied to the writing device 106 while the user 112 composes. In these embodiments, the augmented reality composition system 110 can apply a consistent weight that the user 112 selects by way of a selectable option within the augmented reality environment or by way of a voice command detected via a microphone on the augmented reality device 108.

In these or other embodiments, the augmented reality composition system 110 changes the weight of rendered digital marks based on detecting whether the pressure applied to the writing device 106 exceeds a particular pressure threshold. Indeed, the augmented reality composition system 110 may use multiple pressure thresholds in a tier-based system where, for example, the augmented reality composition system 110 renders digital marks having a particular weight while the pressure applied to the writing device 106 is within a particular pressure range, and where the augmented reality composition system 110 renders digital marks having a different weight while the pressure applied to the writing device 106 is within a different range.

In addition, the augmented reality composition system 110 may adjust other compositional attributes based on different pressures applied to the writing device 106. As used herein, the term "compositional attribute" refers to a visual characteristic of an augmented reality object. In particular, a compositional attribute includes a visual characteristic of an augmented reality object that the augmented reality composition system 110 can modify (e.g., based on changes pressure or tilt of a writing device). For example, a compositional attribute can include a weight, thickness, pigmentation, contrast, darkness, or opacity of an augmented reality object.

To illustrate, in response to detecting that the user 112 is applying a pressure to the writing device 106 that exceeds a pressure threshold, the augmented reality composition system renders digital marks that are darker in color (e.g., blacker, a deeper shade of red, or a more intense coloration of whatever color the augmented reality composition system 110 is currently using). As another example, the augmented reality composition system 110 may render digital marks with a higher opacity (i.e., lines that are less transparent) in response to detecting that the pressure applied to the writing device 106 exceeds a pressure threshold.

In some embodiments, the augmented reality composition system 110 executes a custom command (e.g., as customized by the user 112) in response to detecting a pressure applied to the writing device 106 that exceeds a pressure threshold. For example, the augmented reality composition system 110 detects, by way of the pressure sensor 302, a hard tap that exceeds a threshold, and in response, the augmented reality composition system 110 provides, for display within the augmented reality environment, a shortcut menu including one or more user-selectable options. The augmented reality composition system 110 may execute other custom commands in response to detecting a pressure that exceeds a pressure threshold, as set by the user 112 via, for example, a custom command menu.

Similar to how the augmented reality composition system 110 detects pressure applied to the pressure sensor 302 of the writing device 106 to add digital marks, the augmented reality composition system 110 further detects pressure applied to the pressure sensor 301 of the writing device 106 to remove digital marks. To illustrate, the augmented reality composition system 110 detects variations of pressure applied by the user 112 to depress the eraser 303 on the back end of the writing device 106 into the pressure sensor 301. As the user 112 moves the writing device 106 while holding pressure on the eraser 303, the augmented reality composition system 110 tracks the movement and removes or deletes those digital marks over which the user 112 moves the eraser 303 of the writing device 106. The augmented reality composition system 110 can remove digital marks of any size (depending on user selection) including an entire augmented reality object. In other embodiments, the augmented reality composition system 110 does not include the eraser 303 but can remove digital marks via the tip 304 (e.g., upon user selection of an eraser setting for the tip 304).

In addition to modifying digital marks based on changes in detected pressure, the augmented reality composition system 110 can also utilize the pressure sensor 302 to detect a selection (e.g., selection of a real-world surface or an augmented reality object via a double-tap detected via a pressure sensor). For instance, in a situation where the user 112 composes more than one digital object, the augmented reality composition system 110 can detect a selection of one augmented reality object or the other via input received by way of the pressure sensor 302. Thus, the augmented reality composition system 110 enables the user 112 to edit an augmented reality object at a later time, and further enables the user 112 to go back and forth between augmented reality objects within an augmented reality environment. In addition to editing, the augmented reality composition system 110 further enables the user 112 to move or otherwise manipulate an augmented reality object in three-dimensional space (e.g., within the three-dimensional augmented reality environment).

Furthermore, the augmented reality composition system 110 also utilizes the pressure sensor 302 to detect a selection of a digital object other than a user-created augmented reality object (e.g., augmented reality object 204). As mentioned above, in some embodiments the augmented reality composition system 110 renders a color palette or other user selectable menu object on a real-world surface 202. The augmented reality composition system can also utilize the pressure sensor to detect selection of the color pallet or other selectable menu option. For example, in response to detecting contact by way of the pressure sensor 302 at a location on the real-world surface 202 corresponding to a particular color of a color palette, the augmented reality composition system 110 can change the color of the output of the writing device 106. Likewise, in response to detecting contact via the pressure sensor 302 at a location where a given menu item is rendered on the real-world surface 202 the augmented reality composition system 110 performs the requisite processes to carry out a menu selection.

Figure 3B:
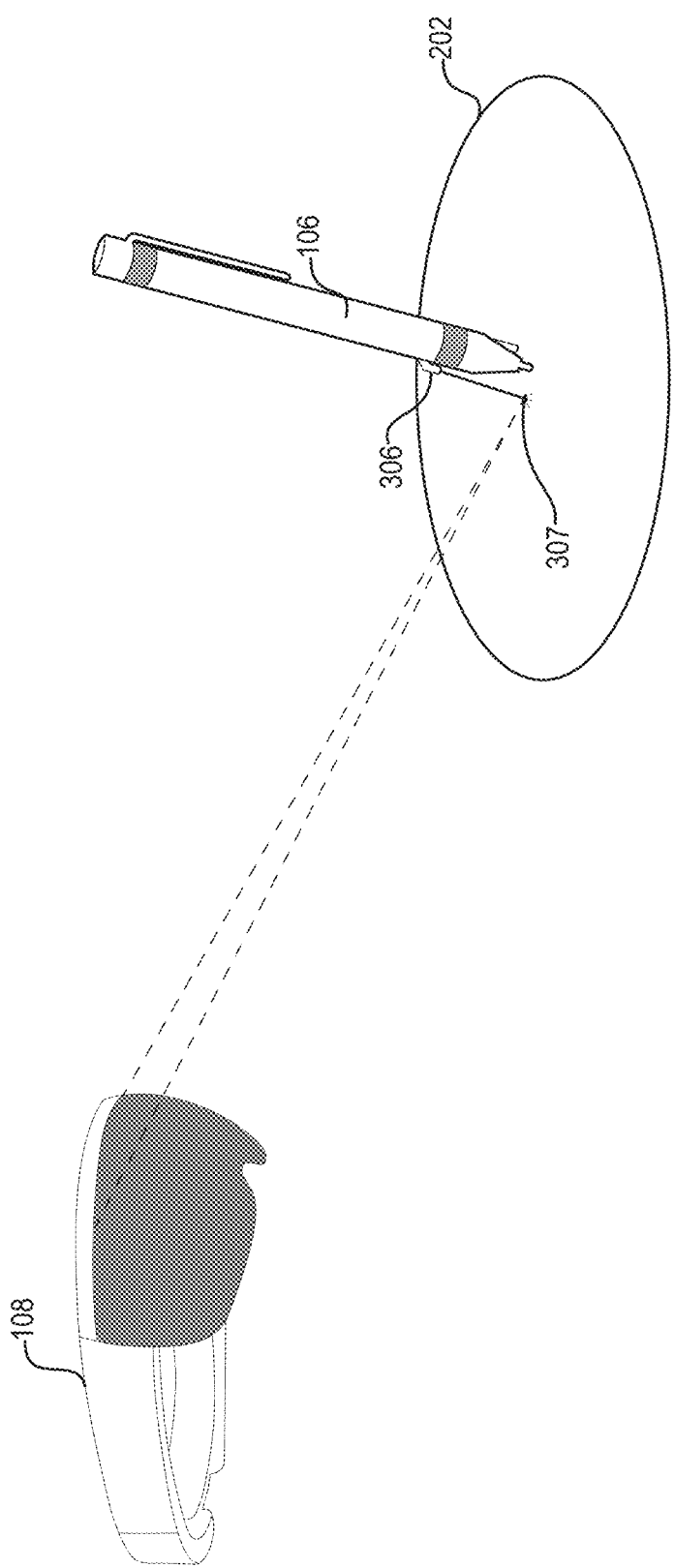
FIG. 3B illustrates an example augmented reality device tracking an example writing device in accordance with one or more embodiments.

As mentioned above, in one or more embodiments, the augmented reality composition system 110 can utilize an emitter element to determine location and/or movement of a writing device. FIG. 3B illustrates an example augmented reality device 108 in communication with an example writing device 106 with an emitter 306. In particular, FIG. 3B illustrates that the emitter 306 is configured to project a visual indicator 307 onto the real-world surface 202. The augmented reality device 108 can detect the location of the writing device 106 by identifying the projected visual indicator 307 on the real-world surface 202.

The emitter 306 can project a variety of different visual indicators. For instance, in some embodiments, the emitter 306 may include a laser emitter that projects the visual indicator 307 in the form of a laser projection onto the real-world surface 202. In other embodiments, the emitter 306 can project a different light form onto the real-world surface 202.

The augmented reality composition system 110 utilizes the visual indicator 307 to determine location of the writing device 106. For example, the augmented reality composition system 100 can perform object recognition techniques to identify the visual indicator 307 on the real-world surface 202. In particular, the augmented reality composition system 110 can utilize a plurality of cameras affixed to the augmented reality device 108 to capture video feeds portraying the real-world surface 202 and the writing device 106 from different viewpoints. The augmented reality composition system 110 can analyze the video feeds to determine a location of the visual indicator 307. Specifically, the augmented reality composition system 110 can analyze the visual indicator 307 portrayed in digital images of the video feeds from multiple viewpoints and determine a location of the visual indicator 307 utilizing various triangulation and/or three-dimensional visual analysis techniques. For example, in one or more embodiments, the augmented reality composition system 110 implements a Simultaneous Localization and Mapping ("SLAM") algorithm to map objects in three-dimensional space based on image data. Additional detail regarding three-dimensional modeling and image analysis techniques is provided below with reference to FIG. 4.

Based on the location of the visual indicator 307, the augmented reality composition system 110 can also determine a location of the writing device 106. For example, the augmented reality composition system 110 can determine an offset from the location of the visual indicator 307 and the tip 304 of the writing device 106. Thus, the augmented reality composition system 110 can apply the offset to the location of the visual indicator 307 to determine the location of the tip 304 of the writing device 106. In one or more embodiments, the augmented reality composition system 110 utilizes the position of the tip 304 of the writing device 106 to render digital marks that appear to emerge from the tip 304 of the writing device 106.

For example, the augmented reality composition system 110 determines a distance or offset between the visual indicator 307 and the tip 304 of the writing device 106 where it is in contact with the real-world surface 202. The offset between the visual indicator 307 and the tip 304 of the writing device 106 can vary, however, depending on the orientation of the writing device 106. Accordingly, in one or more embodiments, the augmented reality composition system 110 determines a position of the tip 304 of the writing device 106 based on both the position of the visual indicator 307 and a detected orientation of the writing device 106. For example, the augmented reality composition system 110 can utilize an IMU to determine an orientation of the writing device 106, calculate an offset between the visual indicator 307 and a tip 304 of the writing device 106 and then determine a location of the tip 304 of the writing device 106. Accordingly, the augmented reality composition system 110 determines an offset (e.g., a vector) from the location of the visual indicator 307 to the location of the tip 304 of the writing device 106. Based on this information, the augmented reality composition system 110 renders augmented reality objects within an augmented reality environment from a location of the tip 304 of the writing device 106 instead of from the location of the visual indicator 307.

Although FIG. 3B illustrates a single visual indicator 307 comprising a single point, the augmented reality composition system 110 can utilize multiple visual indicators and/or visual indicators reflecting different designs or shapes. For instance, in one or more embodiments, the augmented reality composition system 110 utilizes two visual indicators, which increases both the likelihood that the augmented reality composition system 110 can detect at least one of the visual indicators as well as the accuracy of tracking the writing device 106. The augmented reality composition system 110 can utilize the two visual indicators to accurately identify a rotation of the writing device 106 and a location of the tip 304 of the writing device 106. Specifically, the augmented reality composition system 110 can determine a location of a tip 304 of the writing device 106 by analyzing an intersection of two offsets from two different visual indicators.

Similarly, in one or more embodiments, the augmented reality composition system 110 utilizes a visual indicator of a specific shape that indicates an orientation of the writing device 106. For instance, the emitter 306 can project a visual indicator 307 in a shape that points toward the tip 304 of the writing device 106. In such an embodiment, the augmented reality composition system 110 can apply an offset in the direction indicated by the shape to identify the position of the tip 304 of the writing device 106.

The augmented reality composition system 100 can utilize the visual indicator 307 to determine an initial location of the writing device 106 and/or to track movement of the writing device 106. Thus, the emitter 306 can comprise both a locator element and a motion detector element. Indeed, as illustrated in FIG. 3B, the augmented reality composition system 110 can utilize the augmented reality device 108 to obtain video feeds of the writing device 106 and the visual indicator 307 as the writing device 106 moves across the real-world surface 202. The augmented reality composition system 110 can then utilize the visual indicator 307 to dynamically determine the location of the writing device 106.

In this manner, the augmented reality composition system 110 can track the movement of the writing device 106 while the writing device 106 is in contact with the real-world surface 202. For example, the augmented reality composition system 110 determines, by way of the pressure sensor 302, that the writing device is in contact with the real-world surface 202, and based on that determination, tracks the movement of the writing device 106 by tracking changes in location of the visual indicator 307.

In one or more embodiments, the augmented reality composition system 110 refrains from tracking the movement of the writing device 106 when the pressure sensor 302 is not engaged—i.e., when the augmented reality composition system 110 detects that the writing device 106 is no longer in contact with the real-world surface 202. For instance, in some embodiments, the augmented reality composition system 110 only engages the emitter 306 to project the visual indicator 307 upon determining a change in pressure indicative of contact with the real-world surface 202. The augmented reality composition system 110 can then utilize the indicator 307 to track the location of the writing device 106.

In other embodiments, on the augmented reality composition system 110 tracks the movement of the writing device 106 (e.g., relative to its initial location on the real-world surface 202) regardless of whether the writing device 106 remains on the real-world surface 202. To illustrate, in these embodiments, the augmented reality composition system 110 detects the initial location of the writing device 106 as described above, and further tracks the location of the visual indicator 307 in three dimensions, even when the user 112 lifts the writing device 106 off of the real-world surface 202.

Figure 3C:
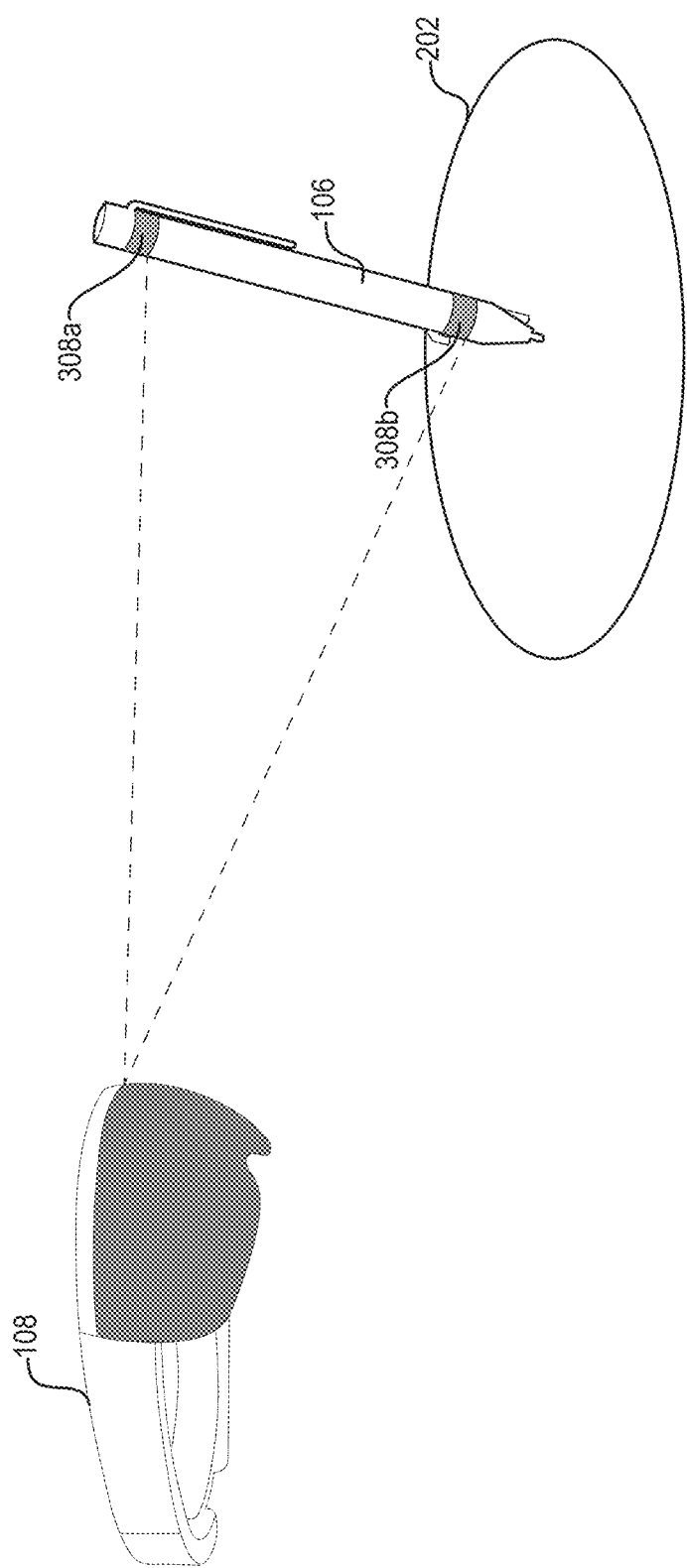
FIG. 3C illustrates an example augmented reality device tracking an example writing device in accordance with one or more embodiments.

As mentioned above, in addition to utilizing the emitter 306, the augmented reality composition system 110 can also utilize reflective elements to determine location and/or movement of a writing device. For example, FIG. 3C illustrates the augmented reality device 108 determining the location of the writing device 106 by way of reflective elements 308a and 308b (referred to herein collectively as "reflective elements 308").

The reflective elements 308 are configured to reflect a particular range of light wavelengths. For example, in some embodiments, the reflective elements 308 are configured to reflect infrared light which is detectable by the augmented reality device 108 via an infrared camera or other sensor. In other embodiments, the reflective elements 308 reflect other wavelengths, such as one or more bands of the visible color spectrum or ultra-violet light wavelengths.

The augmented reality composition system 110 utilizes the reflective elements 308 to determine a position of the writing device 106. For example, in one or more embodiments, camera devices and/or sensors affixed to the augmented reality device 108 capture images of the writing device 106 and the reflective elements 308. The augmented reality composition system 110 can then utilize images of the writing device 106 and the reflective elements 308 to determine an accurate location of the writing device 106.

For example, the augmented reality composition system 110 can utilize various triangulation and/or visual analysis techniques (e.g., SLAM analysis, depth mapping, etc.) in conjunction with images portraying the reflective elements 308 from the augmented reality device 108 to determine the location of the reflective elements 308 on the writing device 106. The augmented reality composition system 110 can then utilize the location of the reflective elements 308 to determine a position of any portion of the writing device 106 (e.g., a tip 304 of the writing device 106). For example, the augmented reality composition system 110 can identify a known differential (distance and/or direction) between the reflective elements 308 and the tip 304 of the writing device 106. Upon determining the location of the reflective elements 308, the augmented reality composition system can apply the known differential to determine the tip 304 of the writing device 106. In this manner, the augmented reality composition system 110 can determine a position (e.g., the initial position) of the writing device 106.

The augmented reality composition system 110 may further utilize the reflective elements 308 to track movement of the writing device 106. As mentioned, in some embodiments the augmented reality composition system 110 tracks the movement of the writing device 106 only while the writing device 106 is in contact with the real-world surface 202, while in other embodiments the augmented reality composition system 110 tracks the movement of the writing device 106 regardless of whether the writing device 106 is in contact with the real-world surface 202. The augmented reality composition system 110 can track the location of the writing device 106 utilizing the reflective elements 308 in either circumstance.

By tracking the reflective elements 308, the augmented reality composition system 110 determines changes in location of the writing device 106, and can thereby render augmented reality objects based on the movement of the writing device 106. Moreover, the augmented reality composition system 110 can generate augmented reality objects that appear to be drawn by the tip 304 of the writing device 106.

Besides tracking the location of the writing device 106, in some embodiments the augmented reality composition system 110 determines a tilt of the writing device 106 by way of the reflective elements 308. To illustrate, in embodiments where the writing device 106 includes two or more reflective elements 308, the augmented reality composition system 110 calculates a slope or angle between the reflective elements 308 to determine a tilt of the writing device 106. Based on the tilt of the writing device 106, the augmented reality composition system 110 may alter various attributes of the augmented reality objects. For instance, the augmented reality composition system 110 may adjust a thickness or weight of the digital marks based on a tilt of the writing device. Thus, for example, the augmented reality composition system 110 can generate a thicker shading digital mark upon detecting a greater tilt of the writing device 106.

While FIG. 3C illustrates the writing device 106 include two reflective elements 308, in some embodiments the writing device 106 may include more or fewer reflective elements 308. Furthermore, the writing device 106 can include reflect elements in different locations with different shapes. Indeed, in one or more embodiments, the reflective elements 308 include markings, variations in shape, or other indications reflecting an orientation of the writing device 106 (e.g., markings indicating what portion of the writing device 106 is facing toward a camera of the augmented reality device 108). Thus, the augmented reality composition system 110 can also determine an orientation of the writing device based on the reflective elements 308.

Figure 3D:
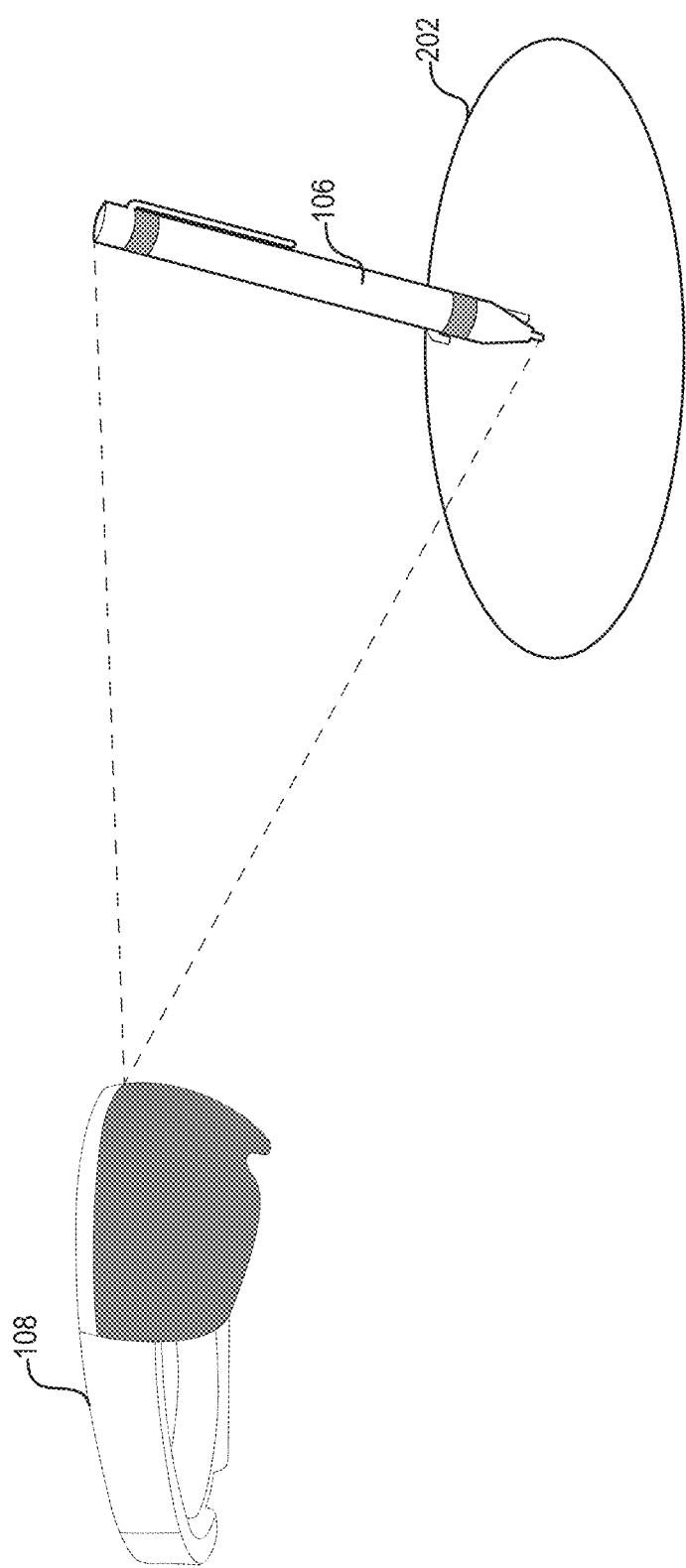
FIG. 3D illustrates an example augmented reality device tracking an example writing device in accordance with one or more embodiments.

As mentioned previously, in addition to reflective elements, the augmented reality composition system 110 may also track movement of a writing device by way of object recognition techniques. For example, FIG. 3D illustrates the augmented reality device 108 performing object recognition to identify and track the movement of the writing device 106. In particular, the augmented reality device 108 captures (via one or more camera devices affixed to the augmented reality device) images that portray the writing device 106. The augmented reality composition system 110 can analyze the digital images to identify the writing device 106 from other objects portrayed in the digital images.

The augmented reality composition system 110 can utilize a variety of object recognition algorithms to identify the writing device 106. For example, in one or more embodiments, the augmented reality composition system 110 utilizes pose clustering, interpretation trees, geometric hashing techniques, scale-invariant feature transforms ("SIFT"), speeded-up robust features ("SURF") algorithms, or bag of words computer vision models to identify the writing device 106.

Upon identifying the writing device 106, the augmented reality composition system 110 can also determine location and/or movement of the writing device 106. For example, as discussed above, the augmented reality composition system 110 can utilize images portraying the writing device 106 to determine a location of the writing device 106. Specifically, the augmented reality composition system 110 can utilize two images portraying the writing device 106 from two cameras to triangulate a location of the writing device 106. Indeed, as described in further detail below with reference to FIG. 4, the augmented reality composition system 110 determines a lateral position of the writing device 106 relative to the augmented reality device 108 (e.g., within the view of the user 112 via the augmented reality device 106) and further determines a depth of the writing device 106 relative to the augmented reality device 108.

Figure 3E:
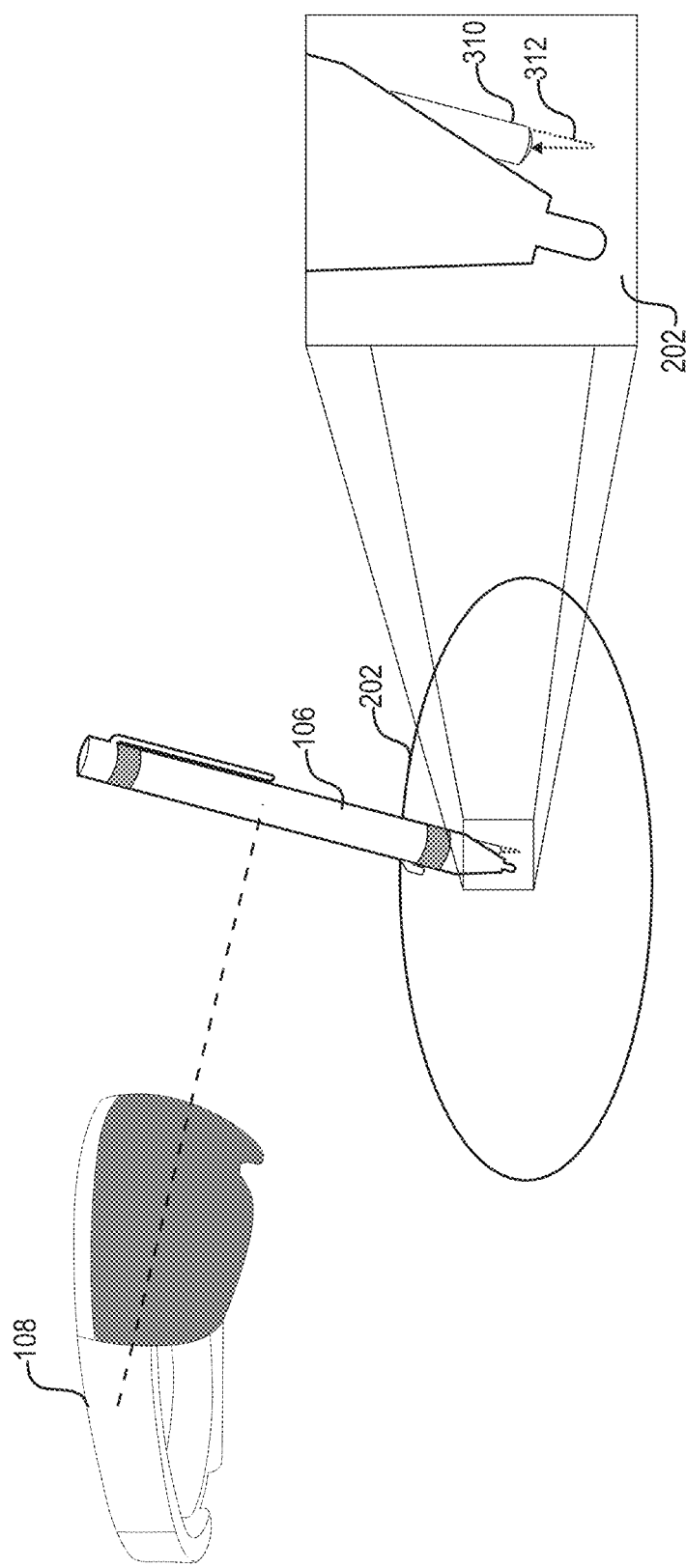
FIG. 3E illustrates an example augmented reality device tracking an example writing device in accordance with one or more embodiments.

As discussed above, in one or more embodiments, the augmented reality composition system 110 can also utilize an optical sensor for determining location of the writing device 106. For example, FIG. 3E illustrates the writing device 106 with in optical sensor 310 in communication with the augmented reality device 108. In particular, FIG. 3E illustrates that the writing device 106 includes an optical sensor 310 with a light source (e.g., a laser, a light-emitting diode ("LED") light, or other light). The augmented reality composition system 110 tracks movement of the writing device 106 by way of the optical sensor 310.

Specifically, as shown in FIG. 3E, the optical sensor 310 projects a light ray 312 from the light source. Moreover, the optical sensor 310 detects reflected light (from the light ray 312) off of the real-world surface 202. Specifically, the optical sensor 310 detects a degree of deflection of the light upon receiving a reflected light off of the real-world surface 202. The degree of deflection changes as the writing device 106 moves on the real-world surface 202. Based on the amount of deflection, the augmented reality composition system 110 can determine a change in location of the writing device 106.

Thus, in one or more embodiments, the augmented reality composition system 110 determines an initial location of the writing device 106 and then utilizes the optical sensor 310 to determine a change in location from the initial location. Specifically, the augmented reality composition system 110 utilizes the optical sensor 310 to determine an amount of deflection, calculate a change in location based on the amount of deflection, and then determine a new location of the writing device 106 by applying the change in location to the initial location.

In some embodiments, the optical sensor 310 may refer to an optoelectronic sensor configured to capture successive images of the real-world surface 202 to track changes in location of the writing device 106 via digital image correlation techniques. In some embodiments, the optical sensor 310 captures standard RGB images, while in other embodiments (e.g., where the texture of a surface is homogenous or difficult to track differences in successive images), the optical sensor 310 projects invisible patterns onto a surface and captures successive images of the projected patterns. More specifically, the optical sensor 310 captures an initial image at an initial location of the writing device 106 and captures additional subsequent images as the writing device 106 moves along the real-world surface 202. The writing device 106 (and/or the augmented reality device 108) may include a processor to analyze and compare the captured images to determine which direction and how fast the writing device 106 is moving along the real-world surface 202 (e.g., by extracting common features from the captured digital images and determining the location of the common features as the writing device 106 moves). Accordingly, the augmented reality composition system may track relative motion of the writing device 106 by translating actual movement of the writing device 106 on the real-world surface 202 into output (or erasures) of digital marks within the augmented reality environment.

In these or other embodiments, the writing device 106 includes one or more processors, a memory, and other components necessary to process and track the movement of the writing device 106. For example, the writing device 106 can utilize one or more processors to determine an amount of deflection and calculate a change in location of the writing device 106. In addition to a processor, the writing device 106 may also include a transceiver element configured to transmit location and/or movement information to the augmented reality device 108 by way of, for example, a BLUETOOTH device.

Figure 3F:
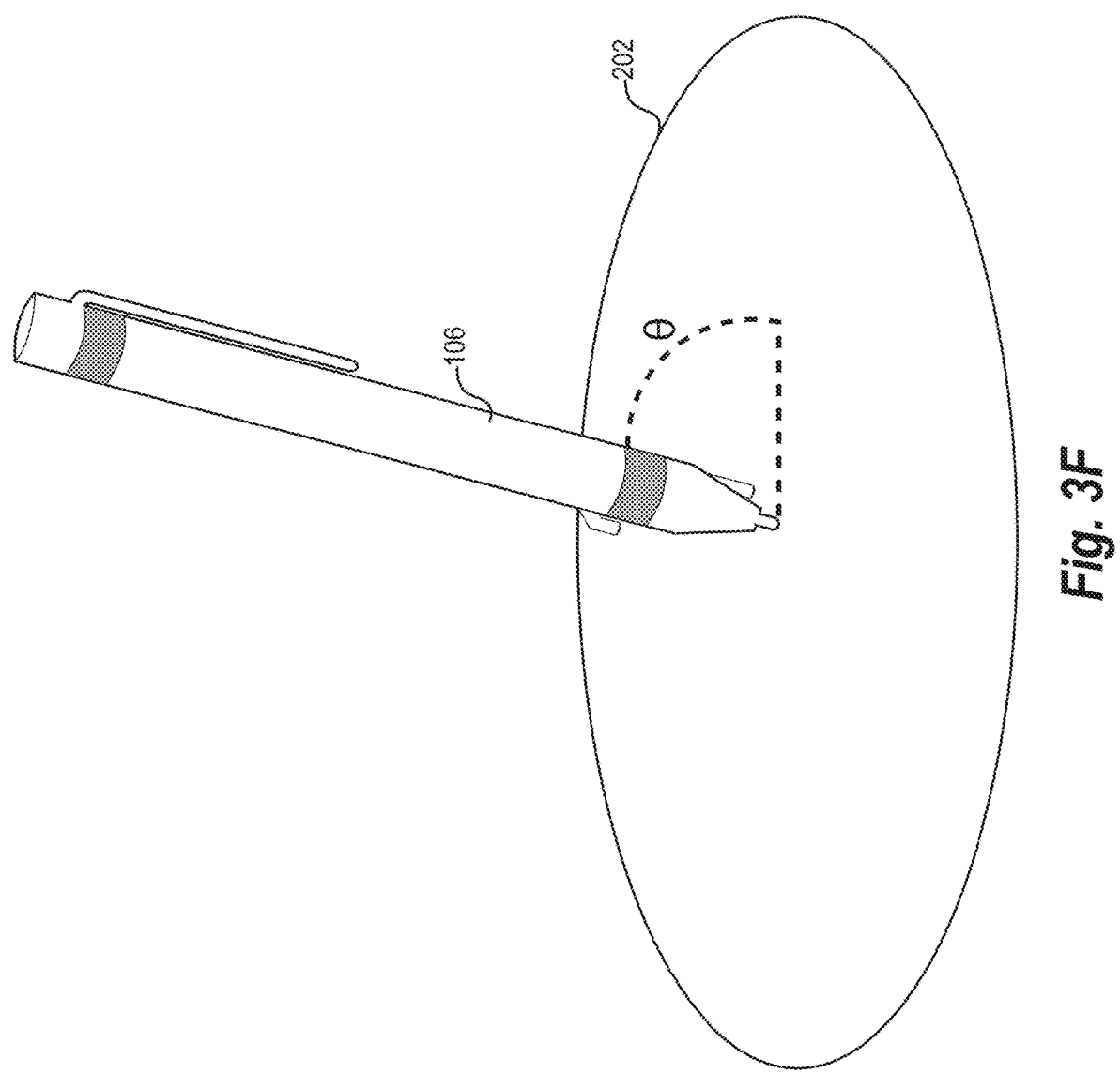
FIG. 3F illustrates an example writing device on an example real-world surface in accordance with one or more embodiments.

As discussed above, the augmented reality composition system 110 can determine an orientation of a writing device. For example, FIG. 3F illustrates the augmented reality composition system 110 determining a tilt angle of the writing device 106 on the real-world surface 202. In particular, FIG. 3F illustrates a tilt angle θ between the real-world surface 202 and the writing device 106.

The augmented reality composition system 110 can determine the tilt angle θ utilizing a variety of different techniques. To elaborate, in relation to FIG. 3F, the augmented reality composition system 110 determines the tilt angle θ between the writing device 106 by way of an IMU (e.g., by determining an amount of tilt via a gyroscope), one or more reflective elements 308 (e.g., by determining a difference in location between two reflective elements and calculating an angle based on the difference in location), and object recognition techniques. By determining the tilt angle θ, the augmented reality composition system 110 more accurately tracks the writing device 106. For instance, the augmented reality composition system 110 can extrapolate a location of the tip 304 of the writing device 106 in situations where the augmented reality device 108 cannot directly recognize or "see" the tip 304 of the writing device 106 (e.g., when the user's 112 hand is blocking the view).

To illustrate, based on a predefined length, width, and/or other dimensions of the writing device 106, and further based on the tilt angle θ, the augmented reality composition system 110 may calculate the location of tip 304 from any given identified portion of the writing device 106. Accordingly, the augmented reality composition system 110 may generate augmented reality objects by generating digital marks from a location of the tip 304 of the writing device 106 within the augmented reality environment, even when the user 112 cannot see the tip 304 of the writing device 106 through the augmented reality device 108 due to an obstruction.

In addition, the augmented reality composition system 110 can adjust attributes of augmented reality objects (i.e., adjust digital marks) based on various values for the tilt angle θ. As discussed above, a greater tilt angle θ may result in thicker lines, darker lines, and/or more opaque lines, while a lesser tilt angle θ may result in thinner lines, lighter lines, or less opaque lines.

Although FIGS. 3A-3F discuss various techniques (generally in isolation) for tracking the movement, orientation, tilt, and pressure of the writing device 106, in one or more embodiments the augmented reality composition system 110 may incorporate two or more of the aforementioned techniques to track the writing device 106. Accordingly, the writing device 106 may include one or more of the above-mentioned features or components, as will be described in further detail below (e.g., with reference to FIGS. 5, 6A-6B).

Though not illustrated in FIGS. 3A-3F, the augmented reality composition system 110 may additionally or alternatively utilize a trained machine learning model to track movement of the writing device 106. In particular, in circumstances where the tip of the writing device 106 is difficult to locate (or in other circumstances), the augmented reality composition system 110 can gather visual cues such as hand position of the user 112, grip shape on the writing device 106, tilt of the writing device 106, previous movements of the writing device 106, etc. Based on these cues, the augmented reality composition system 110 utilizes a machine learning model such as a convolutional neural network to predict movement of the writing device 106.

For example, the augmented reality composition system 110 can train a machine learning model by providing digital images and/or video of a user drafting a composition utilizing a writing device. The augmented reality composition system 110 can also track ground-truth information regarding location, orientation, tilt, and/or movement of the writing device. The augmented reality composition system 110 can provide the digital images and/or video to the machine learning algorithm and generate a prediction of location, orientation, tilt and/or movement. The augmented reality composition system 110 can then compare the prediction to the ground truth information (e.g., the actual location, orientation, tilt, and/or movement). Specifically, the augmented reality composition system 110 can determine a loss function between the prediction and ground truth information. The augmented reality composition system 110 can then utilize the loss function to train the neural network to more accurately predict location, orientation, tilt, and/or movement of a writing device based on images of a user (e.g., images of a user's grip, arm position, etc.).

Figure 4:
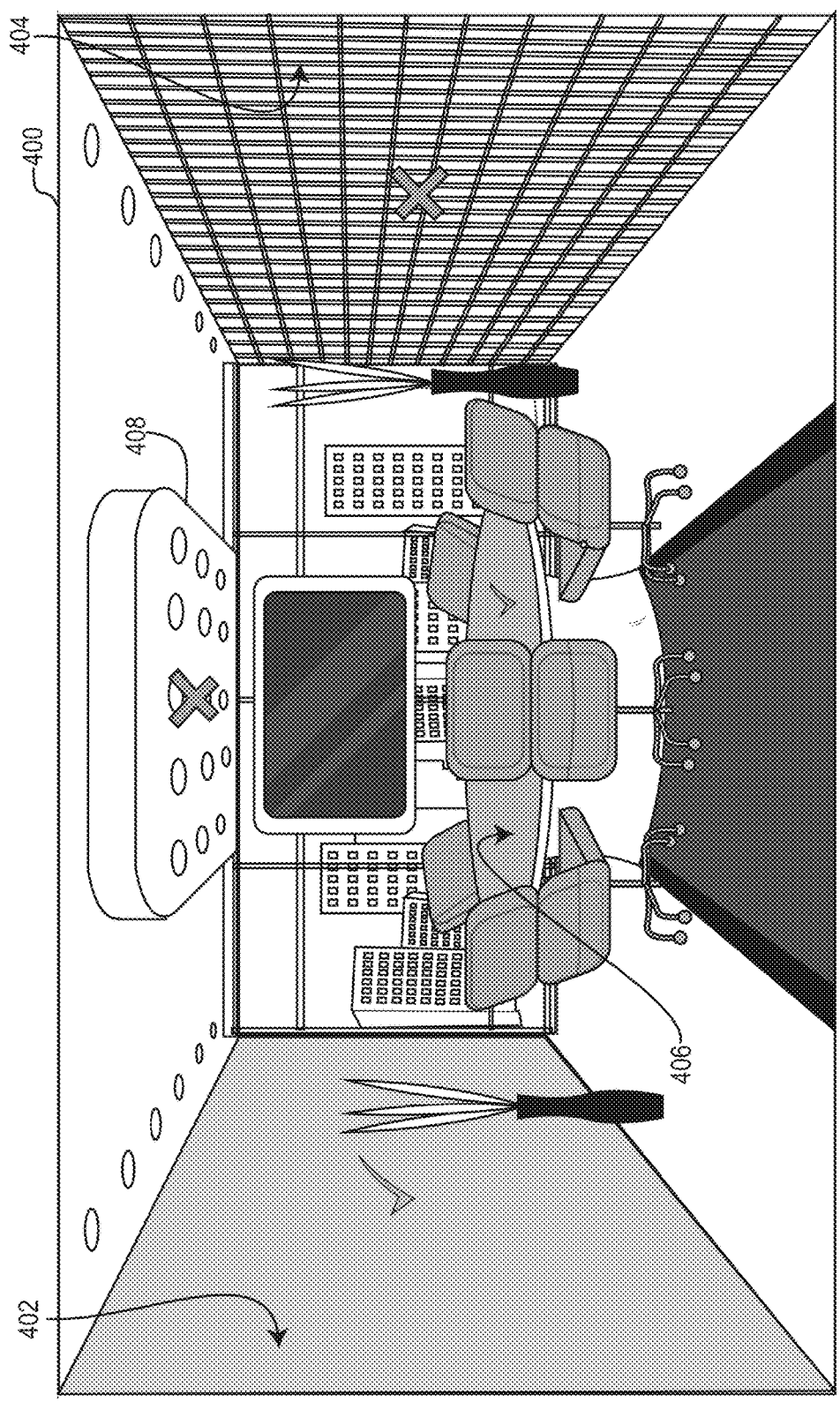
FIG. 4 illustrates identifying and displaying real-world surfaces acceptable for composing via an example augmented reality environment in accordance with one or more embodiments.

As mentioned above, in one or more embodiments, the augmented reality composition system 110 can identify real-world surfaces from a real-world environment. For example, FIG. 4 illustrates an example view 400 of a real-world environment through the augmented reality device 108 in accordance with one or more embodiments. As shown, the real-world environment includes a table, chairs, television, and walls, with various real-world surface 402-408.

To analyze the room illustrated in FIG. 4, the augmented reality composition system 110 implements a three-dimensional modeling algorithm. The augmented reality composition system 110 can utilize a number of different three-dimensional modeling algorithms, including various depth triangulation techniques and/or visual analysis techniques. In relation to the embodiment of FIG. 4, the augmented reality composition system 110 utilizes Simultaneous Localization and Mapping ("SLAM") technologies. With SLAM techniques, the augmented reality composition system 110 can establish correlations between color values (e.g., RGB image values) and depths/positions those RGB values indicate in three-dimensional space. Accordingly, the augmented reality composition system 110 reconstructs a three-dimensional environment (e.g., an augmented reality environment reflecting the view 400) to represent the three-dimensional positions ascertained by way of RGB values. Based on the three-dimensional reconstruction, the augmented reality composition system 110 detects primitive shapes such as, for example, planar surfaces, cuboids, or other relatively large, flat surfaces acceptable for composing.

As just mentioned, in some embodiments, the augmented reality composition system 110 utilizes one or more depth mapping techniques that utilize views from multiple cameras (e.g., cameras associated with the augmented reality device) to ascertain depths of surfaces and objects in three-dimensional space. Additionally or alternatively, the augmented reality composition system 110 utilizes depth image based rendering ("DIBR") techniques to analyze two-dimensional images or video (e.g., as captured by a single camera) to generate three-dimensional approximations of depth for various objects and surfaces within the two-dimensional images. DIBR techniques can include, but are not necessarily limited to, implementing a machine learning model trained to analyze images and determine depths of each portion of an image relative to a camera perspective.

In one or more embodiments, the augmented reality composition system 110 utilizes one or more depth sensors. In such cases, a depth sensor includes, but is not necessarily limited to, an infrared projector and an infrared camera. The infrared projector projects infrared dots (or other output) which the infrared camera captures. Based on the pattern and displacement of the dots that the infrared camera captures, the augmented reality composition system 110 calculates relative depth of objects within a given camera view of a real-world environment. In other cases, a depth sensor additionally includes an RGB camera that captures color values of objects within the real-world environment to increase accuracy of depth calculations. For instance, changes in hue, contrast, or other color values can indicate varying depths within three-dimensional space.

The augmented reality composition system 110 analyzes the room by way of the augmented reality device 108 to identify those surfaces within the room that are acceptable for composing. To determine which of the real-world surfaces 402-408 are acceptable for composing, the augmented reality composition system 110 may perform any of a number of spatial recognition techniques. For example, the augmented reality composition system 110 may analyze each surface in the room to determine which surfaces are sufficiently smooth (and/or within a maximum level of brightness). To illustrate, the augmented reality composition system 110 analyzes each surface to identify those surfaces that are smooth enough (e.g., above a smoothness threshold) and/or non-reflecting enough (e.g., within a threshold level of brightness or reflectivity) where the user 112 could feasibly compose.

Moreover, the augmented reality composition system 110 may analyze each surface in the room to determine which surfaces are sufficiently large and/or sufficiently flat for the user 112 to compose. The augmented reality composition system 110 may identify those surfaces within the view of the room that are above a certain size (e.g., surface area) threshold and/or that are above a certain planar threshold (e.g., a threshold measuring how smooth or flat a surface appears). The augmented reality composition system 110 may analyze each surface for imperfections, bumps, slopes, gaps, uneven portions, etc., to determine whether a given surface meets or exceeds a planar threshold.

Based on analyzing the room to identify acceptable surfaces, the augmented reality composition system 110 renders, within the augmented reality environment 400, an indicator for each of the real-world surfaces 402-408 (e.g., to designate the real-world surfaces as acceptable or not acceptable). In some embodiments, the augmented reality composition system 110 may only designate acceptable surfaces (and may not designate those surfaces that are unacceptable). For purposes of illustration, however, the exemplary embodiment of FIG. 4 indicates those surfaces that are acceptable for composing and those that are not.

As shown in FIG. 4, the augmented reality composition system 110 analyzes the real-world environment and determines that real-world surface 402 is acceptable for composing. In particular, the augmented reality composition system 110 implements one or more of the three-dimensional modeling techniques described above. For instance, in some cases, the augmented reality composition system 110 utilizes a SLAM model to analyze the room illustrated in FIG. 4 to identify those surfaces within the room that are potentially viable for composing. Together with the SLAM model (or other three-dimensional modeling technique), the augmented reality composition system 110 applies a threshold determination to identify those potentially viable surfaces within the room that also satisfy a planar threshold. The augmented reality composition system 110 then generates indicators to label those surfaces as acceptable for composing.

To illustrate, the augmented reality composition system 110 determines that the real-world surface 402 is sufficiently flat and sufficiently large for composing. Based on this determination, the augmented reality composition system 110 designates the real-world surface 402 as acceptable for composing by way of a visual indicator. The visual indicator can take a variety of forms. As shown, the visual indicator may include a check mark, a color overlay (e.g., color shading of the surface), a pattern overlay, and/or a texture overlay for the real-world surface 402. The visual indicator can also have a variety of visual effects, such as flashing, glowing, and/or changing colors. Accordingly, the augmented reality composition system 110 generates the visual indicator within the augmented reality environment 400 and presents the visual indicator for display to the user 112 within the augmented reality environment 400 as an overlay of the real-world surface 402.

As illustrated in FIG. 4, the augmented reality composition system 110 further renders an indicator for real-world surface 404. In particular, the augmented reality composition system 110 analyzes the room depicted in FIG. 4 to determine that the real-world surface 404 is unacceptable for composing. For example, the augmented reality composition system 110 analyzes the real-world surface 404 and determines that the real-world surface 404 does not satisfy a planar threshold, as described above. To illustrate, the augmented reality composition system 110 detects the grooves within real-world surface 404 as illustrated in FIG. 4, and therefore determines that real-world surface 404 does not satisfy the planar threshold and is unacceptable for composing.

Based on determining that real-world surface 404 is unacceptable for composing, the augmented reality composition system 110 renders a visual indicator to designate the real-world surface 404 as unacceptable. The augmented reality composition system 110 can utilize a variety of visual indicators to indicate an unacceptable surface. For example, a visual indicator may include an "x." Similarly, as mentioned above, the visual indicator can include a particular color, texture, pattern, or effect. In this manner, the augmented reality composition system 110 generates the visual indicator and renders the visual indicator as an overlay of the real-world surface 404 within the augmented reality environment 400.

The augmented reality composition system 110 may identify multiple acceptable surfaces within a single real-world environment. For instance, similar to the discussion above with reference to real-world surface 402, the augmented reality composition system 110 determines that the real-world surface 406 is also acceptable for composing. Indeed, as shown in FIG. 4, the augmented reality composition system 110 generates visual indicators in the form of check marks and a particular color overlay for each of real-world surface 402 and the real-world surface 406.

The augmented reality composition system 110 can also identify multiple surfaces unacceptable for composing. For instance, as shown, the augmented reality composition system 110 designates real-world surface 408 as unacceptable for composing. In particular, the augmented reality composition system 110 analyzes the real-world surface 408 and determines that the surface is too uneven (e.g., not smooth enough and/or not large enough) to be a feasible surface on which user 112 could compose. Indeed, as shown in FIG. 4, the real-world surface 408 contains a number of canned light fixtures, which render the real-world surface 408 unacceptable for composing.

Based on determining that a real-world surface is acceptable for composing, the augmented reality composition system 110 provides the functions and features described herein for enabling a user 112 to compose within an augmented reality environment by way of a writing device 106 on a real-world surface. In contrast, based on determining that a real-world surface is unacceptable for composing, the augmented reality composition system 110 may disable one or more of the functions and/or features described herein. In other embodiments, however, the augmented reality composition system 110 may still enable a user 112 to compose on a surface that is identified as unacceptable. Thus, in these embodiments, designating a real-world surface (e.g., real-world surface 404 or 408) may serve as a warning rather than a prohibition.

In some embodiments, the augmented reality composition system 110 enables user 112 to relocate an augmented reality object from one surface to another. To illustrate, the augmented reality composition system 110 analyzes the room illustrated in FIG. 4 to determine that real-world surfaces 402 and 406 are acceptable for composing. In addition, the augmented reality composition system 110 provides an option (e.g., a user selectable digital element within the augmented reality environment 400 or via detecting a voice command) for the user 112 to save an augmented reality object that is currently in progress. The augmented reality composition system 110 further provides an option for the user 112 to load a saved augmented reality object to render the augmented reality object on a different real-world surface. For example, the augmented reality composition system 110 renders the augmented reality object on a different real-world surface in the same room of FIG. 4 or else on a new surface in a different place altogether.

In some cases, the user 112 need not save an augmented reality object to move it to another surface. Rather, the augmented reality composition system 110 detects a user selection of the augmented reality object and detects a motion to carry, throw, or otherwise move the augmented reality object from, for example, real-world surface 402 to real-world surface 406, whereupon the augmented reality composition system 110 renders the augmented reality object as an overlay of the real-world surface 406.

Similarly, in some embodiments the augmented reality composition system 110 enables a user 112 to pass an augmented reality object to another user. To illustrate, the augmented reality composition system 110 detects a selection of an augmented reality object as described above, and the augmented reality composition system 110 further detects movement such as a touch-and-drag motion to move the augmented reality object. In some embodiments, the augmented reality composition system 110 detects a selection (e.g., a press-and-hold by way of the writing device 106 or a voice command by way of the augmented reality device 108) of an augmented reality object and further detects movement of the writing device 106 to drag the augmented reality object to transfer to another user.

To successfully transfer an augmented reality object, in some embodiments, the augmented reality composition system 110 requires that the users be within a threshold distance of each other or some other limiting factor (e.g., requires that user 112 uses the writing device 106 to tap the writing device of the other user to indicate a transfer of the augmented reality object). In any case, the augmented reality composition system 110 transfers (or sends a copy of) the augmented reality object to the other user by way of an augmented reality device of the other user.

Although FIG. 4 illustrates a single view 400, the augmented reality composition system 110 may generate different views including designations of surfaces that are acceptable for composing in response to movement by the user 112. For example, as the user 112 turns to look at different parts of the room or walks to enter a different room, the augmented reality composition system 110 may continue to generate and expand the view 400 to include new surfaces, and may store in memory information pertaining to previously-analyzed surfaces that may or may not be within the current view of the user 112 as seen via the augmented reality device 108. To elaborate, the augmented reality composition system 110 may store a three-dimensional location of each identified surface and may further store an indication of whether each identified surface is acceptable or unacceptable for composing within an augmented reality environment. Thus, as the user 112 returns to previous rooms or turns back to look at surfaces which the augmented reality composition system 110 has already analyzed, the augmented reality composition system 110 may render and overlay the same visual indicators by displaying augmented reality objects from the augmented reality environment 400.

Indeed, as mentioned previously, an augmented reality environment may be a three-dimensional map of locations, surfaces, objects, etc., that the augmented reality composition system 110 analyzes, identifies, and stores in memory. Thus, based on detecting movement, rotation, etc., of the augmented reality device 108 (e.g., by way of a global position system ("GPS") device, IMU, etc.) the augmented reality composition system 110 determines distances, angles, and other relationships between each identified surface, object, etc., within a real-world environment and generates an augmented reality environment. By generating a three-dimensional augmented reality environment, the augmented reality composition system 110 can render overlays on each identified surface, object, etc., based on the three-dimensional coordinates of the same.

As discussed above, the augmented reality composition system 110 can utilize different techniques in different circumstances to track a writing device and generate augmented reality objects. For instance, the augmented reality composition system 110 can utilize a first technique to determine an initial location of the writing device 106 on a real-world surface (e.g., real-world surface 202), and can use the same or other techniques to track movement of the writing device 106. This approach allows the augmented reality composition system 110 to operate efficiently (e.g., safe valuable processing resources) and accurately (e.g., utilizing the most accurate techniques for tracking a writing device in a particular circumstance).

For example, FIG. 5 illustrates an example table 500 illustrating various techniques that the augmented reality composition system 110 can utilize in different circumstances or situations. For example, the table 500 includes a vertical column of different situations in which the augmented reality composition system 110 can operate. FIG. 5 further illustrates a horizontal row of techniques and/or features by which the augmented reality composition system 110 can perform the various functions described herein.

To detect different circumstances, the augmented reality composition system 110 analyzes writing surfaces (e.g., real-world surface 202), lighting conditions, and other factors of the real-world environment, in addition to movement, tilt, and other factors associated with the writing device 106. Depending on the circumstances identified by the augmented reality composition system 110, the augmented reality composition system 110 determines appropriate techniques to implement to monitor the writing device 106 and render augmented reality objects within an augmented reality environment (e.g., augmented reality environment 404).

The augmented reality composition system 110 can utilize a variety of methods to determine what techniques to utilize under what circumstances. For example, in one or more embodiments, the augmented reality composition system 110 determines a technique based on user selection and/or user preferences. To illustrate, the augmented reality composition system 110 may provide user selectable options for a user to choose what techniques to apply in particular circumstances. The augmented reality composition system 110 can store and access such settings defined by the user 112 that dictate how the augmented reality composition system 110 responds to particular detected circumstances.

In one or more embodiments, the augmented reality composition system 110 pre-defines what techniques to utilize in what circumstances. For instance, in one or more embodiments, the augmented reality composition system 110 stores the table 500 and, in response to detecting particular circumstances, applies the techniques indicated in the table 500 (while restricting the techniques not indicated).

Alternatively, the augmented reality composition system 110 may utilize a machine learning model or a Kalman filter to determine which techniques are more effective (e.g., more accurate or more computationally efficient) under what circumstances. To illustrate, the augmented reality composition system 110 may utilize a machine learning model that is trained (e.g., based on past performance as indicated by response to user survey or other user input) to identify those tracking techniques that are effective in particular circumstances (e.g., what technique(s) are most effective when the writing device 106 is moving fast versus when the writing device 106 is moving slowly, what technique(s) are most effective under good lighting conditions versus bad lighting conditions). Additionally, the augmented reality composition system 110 may switch between the various techniques described in table 500 of FIG. 5, and may further combine one or more of the techniques in a given circumstance in accordance with the machine learning model.

As shown in FIG. 5, the augmented reality composition system 110 may utilize or exclude techniques or features in response to detecting different circumstances. For instance, as shown in FIG. 5, the augmented reality composition system 110 may detect fast movement of a writing device (e.g., a user quickly scribbling on a writing surface). Some techniques may be more efficient and/or accurate in tracking fast movement of a writing device. Indeed, in relation to the embodiment of FIG. 5, in response to detecting fast movement of a writing device, the augmented reality composition system 110 tracks the writing device by way of an optical sensor, an IMU, and/or a machine learning technique.

To elaborate, the augmented reality composition system 110 may detect a speed at which the user 112 moves the writing device 106, and may further determine whether the speed exceeds a speed threshold (e.g., corresponds to a fast speed or a slow speed). In some embodiments, however, the augmented reality composition system 110 may implement multiple speed thresholds to delineate between various speeds of the writing device 106 instead of only determining between two different speeds.

When the augmented reality composition system 110 determines that the writing device is moving fast, the augmented reality composition system 110 can implement those techniques which are better suited for detecting fast movement. For example, with regard to FIG. 5, the augmented reality composition system 110 tracks fast movement of the writing device 106 using one or more of: an optical sensor (as described above with reference to FIG. 3E), an IMU, and/or a machine learning model.

For instance, as discussed above, to track movement of the writing device 106 via a machine learning model, the augmented reality composition system 110 trains a neural network (e.g., a convolutional neural network) or other deep learning model based on previous movements of the user 112, the writing device 106, and/or other a training set of other users or writing devices. The augmented reality composition system 110 further trains the machine learning model based on visual cues such as arm position of the user 112, hand position, grip shape on the writing device 106, tilt of the writing device 106, among others. In addition, the augmented reality composition system 110 may implement an error reducing technique in training the model to improve the accuracy of the model in predicting movement. Using a trained model, the augmented reality composition system 110 can more accurately determine movements of the writing device 106, especially in situations where direct line of sight between the augmented reality device 108 and the writing device 106 is obstructed, by predicting where the writing device 106 is located based on movement by the user 112.

In addition to fast movement, as shown in FIG. 5, the augmented reality composition system 110 may also implement one or more of a number of techniques in response to slow movement of the writing device 106. For example, as shown in FIG. 5, in response to detecting slow movement of a writing device, the augmented reality composition system 110 may use a reflective element such as infrared tape (as discussed above with reference to FIG. 3C), an emitter (e.g., a laser emitter) operable to project a visual indicator onto a real-world surface (as discussed above with reference to FIG. 3B), an optical sensor (as discussed above with reference to FIG. 3E), and/or object recognition techniques.

As further illustrated by FIG. 5, the augmented reality composition system 110 may also select different techniques in response to detecting that a writing device is in an initial position for generating a drawing mark. Indeed, in response to detecting a change in pressure that indicates that a writing device is in contact with a real-world surface, the augmented reality composition system 110 can select one or more techniques to detect the initial position.

In some embodiments, the augmented reality composition system 110 may implement techniques similar to those that the augmented reality composition system 110 uses to track slow movement of the writing device 106 in order to determine an initial location of the writing device 106. For instance, as shown in FIG. 5, upon detecting initial contact between a writing device and a real-world surface, the augmented reality composition system 110 can utilize a reflective element, an emitter, and/or object recognition techniques (described in detail above) to determine the initial position.

Indeed, as described above, the augmented reality composition system 110 may determine an initial location by detecting a three-dimensional coordinate location of one or more reflective elements located on the writing device via an augmented reality device 108. The augmented reality composition system 110 determines a three-dimensional coordinate of the reflective element(s) by implementing one or more three-dimensional modeling techniques (e.g., SLAM analysis, depth mapping, or other three-dimensional image analysis methods) described above. In accordance with the three-dimensional analysis, the augmented reality composition system 110 translates the three-dimensional real-world coordinate of the reflective element(s) into a three-dimensional coordinate of the writing device 106 within the augmented reality environment. In cases where the reflective element(s) are not located immediately on the tip of the writing device 106, the augmented reality composition system 110 further calculates a distance between the reflective element(s) and the tip of the writing device 106 in order to determine the initial location of the tip of the writing device to render augmented reality objects as described above.

In addition to, or alternatively to, using a technique to detect reflective elements, the augmented reality composition system 110 may detect a location of a visual indicator projected by an emitter associated with the writing device 106. As described above, the writing device 106 may include an emitter that projects a visual indicator onto a real-world surface. To detect the initial position of the writing device 106 based on the position of a visual indicator projected onto a real-world surface, the augmented reality composition system 110 receives information that indicates a position (e.g., a distance and an angle) of the emitter relative to the tip of writing device 106. Based on this information, the augmented reality composition system 110 calculates a distance from the visual indicator projected onto the real-world surface to the tip of the writing device 106. Accordingly, the augmented reality composition system 110 determines an initial position of the writing device 106 using the emitter of the writing device 106.

As another technique to determine an initial position of the writing device 106, the augmented reality composition system 110 may implement one or more object recognition techniques. In particular, the augmented reality composition system 110 implements a spatial recognition technique such as depth mapping to determine a position of the writing device 106 relative to a real-world surface. By using depth mapping or other three-dimensional modeling method, the augmented reality composition system 110 determines a three-dimensional coordinate location of the writing device 106 on the real-world surface.

As further illustrated in table 500 of FIG. 5, the augmented reality composition system 110 may also select one or more techniques in response to detecting tilt of a writing device. For example, the augmented reality composition system 110 can implement techniques that are most effective at detecting tilt in response to detecting that a writing device exceeds a particular tilt threshold. For instance, in response to detecting that a writing devices satisfies a tilt threshold, the augmented reality composition system 110 can track further tilt of the writing device by way of reflective elements, object recognition technologies, and/or an IMU.

For example, the augmented reality composition system 110 may determine a tilt of the writing device 106 by way of reflective elements associated with the writing device 106. As described above, the augmented reality composition system 101 may determine an angle between a first reflective element located near the tip of the writing device 106 and a second reflective element near the opposite end of the writing device 106.

Similarly, the augmented reality composition system 110 may determine a tilt of the writing device 106 via one or more object recognition techniques described herein. To illustrate, the augmented reality composition system 110 determines three-dimensional coordinate location of the tip of the writing device 106 and further detects a three-dimensional coordinate location of an eraser or back end of the writing device 106. In addition, the augmented reality composition system 110 determines a slope between these two locations to calculate the tilt of the writing device 106.

As an alternative, or in addition, the augmented reality composition system 110 may determine a tilt of the writing device 106 by way of an IMU associated with the writing device 106. To illustrate, the augmented reality composition system 110 may detect an angle that the user 112 is holding the writing device 106 via an accelerometer and/or gyroscope, and may further detect changes in the angle in a similar fashion. Indeed, the augmented reality composition system 110 receives information from the IMU associated with the writing device 106, which information can include an instantaneous tilt of the writing device 106 at any given point in time, and which updates at regular intervals (e.g., every millisecond, every microsecond), or else updates whenever the augmented reality composition system 110 queries the writing device 106 for tilt information.

As also illustrated in FIG. 5, in addition to tilt, the augmented reality composition system 110 can also apply different techniques in response to different lighting within the real-world environment. For example, in some embodiments the augmented reality composition system 110 can detect lighting conditions (e.g., via a camera or ambient light sensor of an augmented reality device 108) and determine one or more lighting conditions (e.g., too dark, too bright, glare, etc.). Upon detecting the lighting conditions the augmented reality composition system 110 can select a technique appropriate to the lighting conditions.

For instance, in one or more embodiments, the augmented reality composition system 110 tracks a writing device in areas with bad lighting by using techniques that are less susceptible to lighting effects. For example, in situations where the ambient lighting prevents sensors and/or cameras associated with the augmented reality device 108 from effectively locating and/or tracking the writing device 106 (e.g., due to glares, overly bright lights, dim or dark conditions, etc.), the augmented reality composition system 110 may utilize one or more techniques to effectively track movement of the writing device 106. As shown in FIG. 5, in one or more embodiments, the augmented reality composition system 110 utilizes a reflective element, an optical sensor, and/or an IMU.

Indeed, to illustrate, in one or more embodiments, the augmented reality composition system 110 utilizes reflective elements located on the writing device 106 to track the writing device 106. For instance, as described above, the reflective elements are configured to reflect a specific range of light wavelengths such as, for example, infrared light. Thus, the augmented reality composition system 110 tracks the reflective elements by detecting infrared (or other wavelengths) light reflected off of the reflective elements by way of an infrared camera or other light sensor configured to capture the particular light reflected light wavelengths. Therefore, even in circumstances where lighting is bad (e.g., it is difficult to see due to darkness, glares, etc.), visible light wavelengths that affect the visibility of the writing device 106 have little to no effect on an infrared camera detecting infrared light. Thus, the augmented reality composition system 110 can effectively track the writing device 106 in bad lighting via reflective elements, as illustrated in FIG. 5.

In some embodiments, augmented reality composition system 110 may additionally or alternatively implement a technique that uses the above-described optical sensor to track the writing device 106 in bad lighting conditions. In particular, since the optical sensor is located on the writing device 106, a processor on the writing device 106 can process successive images or other changes in reflected light to determine relative motion of the writing device 106. The augmented reality composition system 110 receives the movement information from the writing device 106 via BLUETOOTH or some other communication method. Thus, by utilizing an optical sensor, the augmented reality composition system 110 effectively tracks the writing device 106 even in bad lighting.

In a similar fashion, in some embodiments, the augmented reality composition system 110 tracks the writing device 106 via an IMU of the writing device 106. As described above, the IMU collects information such as acceleration, position change, relative direction, angle, orientation, and elevation of the writing device 106. The augmented reality composition system 110 receives this information from the writing device 106 via BLUETOOTH and thereby calculates movement, tilt, and orientation of the writing device 106. Thus, by using the IMU, the augmented reality composition system 110 is unaffected by bad lighting in tracking the writing device 106.

As shown in FIG. 5, in situations where the lighting around the writing device 106 is good, the augmented reality composition system 110 may track movement of the writing device 106 by way of techniques that are more camera-reliant. For example, the augmented reality composition system 110 may track the writing device by way of one or more reflective elements associated with the writing device 106 (which may be operable in good or bad lighting, depending on the particular circumstances) or an emitter (which also may work in good or bad lighting, depending on the circumstance, such as when the lighting is dark).

As further illustrated in FIG. 5, the augmented reality composition system 110 can also select a technique upon detecting characteristics of a real-world surface (e.g., a reflective surface). For instance, in one or more embodiments, the augmented reality composition system 110 detects characteristics (e.g., reflectivity) of a surface utilizing a camera affixed to an augmented reality device. To illustrate, the augmented reality composition system 110 may determine that a surface is reflective by detecting a brightness of light reflected off of the real-world surface and determining that the brightness meets or exceeds a threshold.

In response to detecting surface characteristics, the augmented reality composition system can select techniques for tracking the writing device 106 (e.g., by way of techniques that are less sensitive to changes in light). For instance, as shown in FIG. 5, the augmented reality composition system 110 may utilize object recognition techniques, an IMU, or machine learning techniques.

As shown in FIG. 5, the augmented reality composition system 110 can also detect that a surface is not reflective and select a technique for tracking the writing device 106. For instance, the augmented reality composition system 110 determines that the surface is non-reflective by detecting an intensity or brightness of light reflected off of the real-world surface and determining that the brightness is below a threshold. In response to determining that a real-world writing surface on which the user is composing is non-reflective, the augmented reality composition system 110 implements a technique to effectively track the writing device 106. As shown in FIG. 5, the augmented reality composition system 110 tracks the writing device 106 by way of one or more reflective elements, an emitter, an optical sensor and/or a trained machine learning model.

As further illustrated in FIG. 5, the augmented reality composition system 110 may select one or more tracking techniques in response to detecting that all or part of the writing device 106 is blocked from view (e.g., view of the augmented reality device 108). In particular, the augmented reality composition system 110 may detect when the tip of the writing device 106 is obstructed from the view of the augmented reality device 108 (e.g., when the user's hand or arm is in the way), and may therefore implement one or more of the techniques indicated within table 500 to track the writing device 106. For example, the augmented reality composition system 110 may track the writing device 106 via techniques that are less reliant on a clear line of sight such as an optical sensor, an IMU, or a machine learning technique. Similarly, where a tip of the writing device is out of view (but other portions of the writing device are within view), the augmented reality composition system 110 may also utilize a reflective element or object recognition technique to track the writing device.

Although FIG. 5 illustrates example techniques that are applicable in certain situations, it will be understood that in some embodiments, the augmented reality composition system 110 may utilize additional or alternative techniques (or additional or alternative combinations) for the situation listed in FIG. 5. For example, the augmented reality composition system 110 may implement a trained machine learning model in situations with good lighting. Additionally, the augmented reality composition system 110 may, in some embodiments, determine a tilt of the writing device 106 by way of object recognition techniques. Indeed, the augmented reality composition system 110 may implement each of the techniques and/or features described herein alone or in combination with other techniques/features to determine the initial position of, tilt of, and track movement of, the writing device 106.

Furthermore, the augmented reality composition system 110 may combine two or more of the techniques described in relation to FIG. 5. Moreover, the augmented reality composition system 110 can detect multiple circumstances at a given time and utilize techniques associated with each of the circumstances. Indeed, in some cases, two or more of the circumstances described in table 500 will be satisfied at the same time such as, for example, fast movement of the writing device 106 on a reflective surface in bad lighting. Accordingly, the augmented reality composition system 110 determines which techniques to implement to most effectively (e.g., most accurately, most computationally efficiently) monitor the writing device 106.

As described above, the augmented reality composition system 110 may implement a machine learning model to determine which techniques are most effective in given circumstances. Alternatively, the augmented reality composition system 110 may access user settings to determine which techniques to implement in given circumstances. For instance, a user 112 may set preferences to only use the emitter when the writing device 106 is moving slowly, or else to always track the writing device 106 via the reflective elements, or else to always use the optical sensor together with the IMU, but never to use object recognition (e.g., to save battery). In any case, the augmented reality composition system 110 may combine two or more of the techniques described with reference to FIG. 5.

As also described above, the augmented reality composition system 110 may change between techniques in real time as the user 112 draws with the writing device 106. For example, in cases where the user 112 is composing outside, the ambient lighting may change with cloud cover as time passes, and the user may draw slowly at times and quickly at other times. Accordingly, the augmented reality composition system 110 detects such changes in the circumstances and changes between tracking techniques accordingly in an on-the-fly manner in real time or near real time.

To combine two or more techniques at a time, the augmented reality composition system 110 may take average values across the applied techniques. To illustrate, the augmented reality composition system 110 may detect a tilt of the writing device 106 by way of the IMU and also via object recognition. The augmented reality composition system 110 may detect a difference between the tilt determined via the IMU and the tilt determined via object recognition. In these cases, the augmented reality composition system 110 may average the two values to calculate the tilt of the writing device 106. In some embodiments, the augmented reality composition system 110 may apply different weights to the different techniques applied in a given circumstance depending on which techniques are determined to be more effective in the given circumstance. For example, as the user 112 moves the writing device 106 slowly, the augmented reality composition system 110 may determine, based on the machine learning model described above, that the optical sensor is more accurate than the IMU given the circumstances. Accordingly, the augmented reality composition system 110 may still apply both techniques based on user settings (or as determined by the augmented reality composition system 110, as described above), but may apply a heavier weight to the readings of the optical sensor than to readings from the IMU when calculating an average of the two techniques.

Figure 6A:
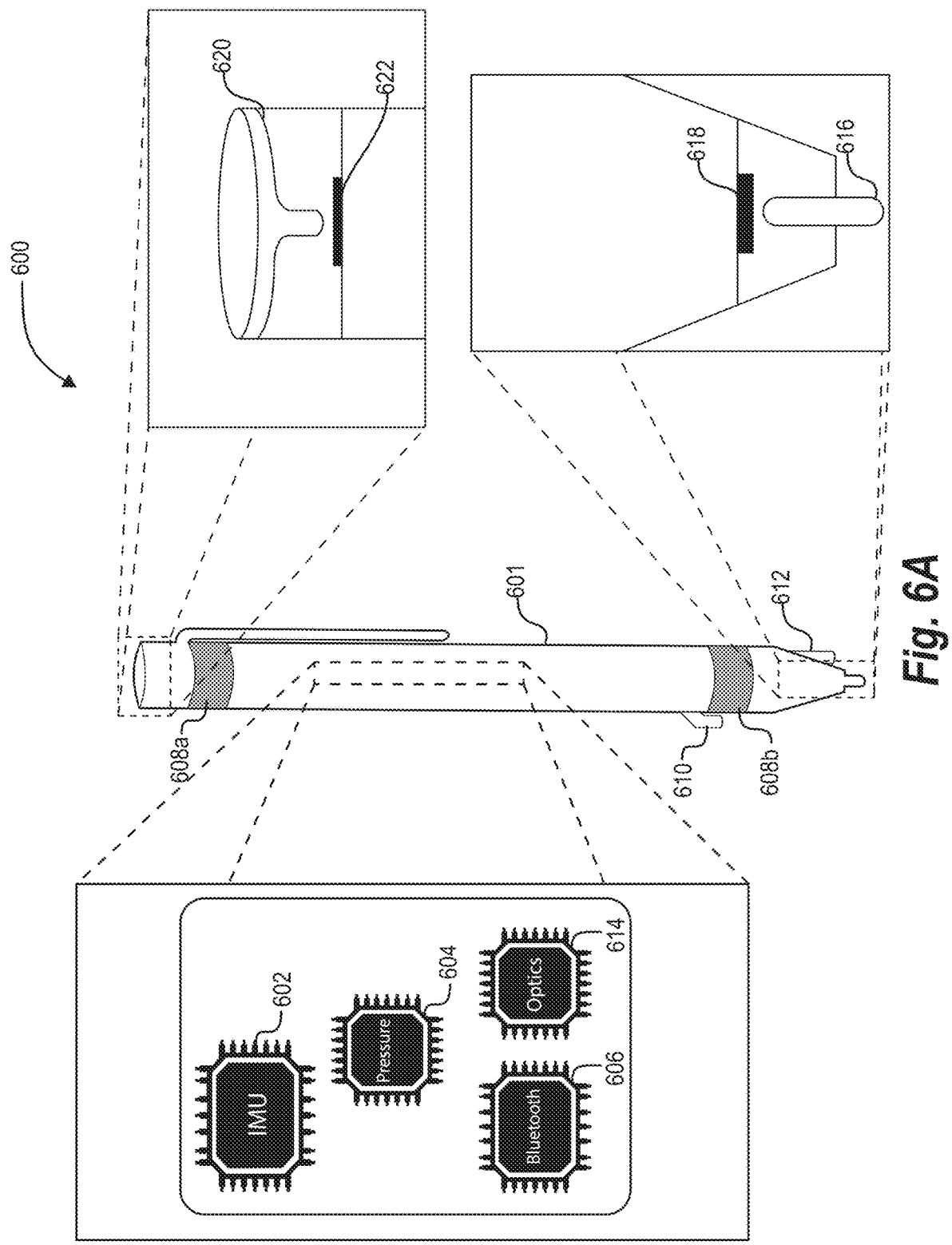
FIG. 6A illustrates an example writing device including one or more components in accordance with one or more embodiments.

Turning now to FIGS. 6A-6B, additional detail will be provided regarding components of a writing device in accordance with one or more embodiments. For example, FIG. 6A illustrates an example writing device 600. In particular, the writing device 600 includes a housing 601 that is composed of any suitable material such as, for example, metal, plastic, or a combination thereof. For example, the housing 601 may include a pocket clip made of metal while the body of the housing 601 is made of plastic. As another example, the housing 601 is composed of a continuous piece of metal from end to end. In any case, the housing 601 is made of material that is structurally sufficient for the user 112 to hold, squeeze, press, tap, and otherwise apply strain and pressure while writing without breaking.

Generally speaking, the housing 601 includes those portions of the writing device 600 that are structural in nature—i.e., that connect other components of the writing device 600 together. As illustrated in FIG. 6A, the housing includes a cylindrical portion that extends from a circular back end including an eraser 620 toward a tip end that includes a tip 616. Near the tip 616, the housing 601 in FIG. 6A narrows to a point in a conical shape that connects on one end to the cylindrical body portion and connects on the other end to the tip 616.

In addition, the housing 601 need not be cylindrical in shape. For instance, in some embodiments, the housing 601 is prismatic—e.g., the housing 601 may be a triangular prism, a rectangular prism, a hexagonal prism, an octagonal prism, or other prismatic shape. To illustrate, the back end of the writing device 600 that includes the eraser 620 may have a profile of a triangle when observed straight on. Accordingly, the housing 601 extends from the back end of the writing device 600, where each side of the triangle distally extends the length of the writing device 600 to form a triangular prism to the portion near the tip of the writing device 600 that narrows to the tip 616. Indeed, in these embodiments, the narrowing portion is a triangular pyramid in shape where the base of the triangular pyramid connects with the triangular prism of the main portion of the housing 601, and where the top of the triangular pyramid contains the tip 616.

In other embodiments, the eraser 620 is square (or rectangular) in profile when observed straight on. In these embodiments, the housing 601 extends from the eraser 620 along each side of the square to form a rectangular prism of the body of the writing device 600. Likewise, in one or more embodiments, the housing 601 extends from the sides of the eraser 620 toward the tip 616.

Regardless of the shape of the housing 601, the housing 601 connects and/or contains other components of the writing device 600. For example, the writing device 600 includes components in the form of chips or integrated circuits that are configured for various purposes. To illustrate, the writing device 600 includes an IMU 602, a pressure sensor chip 604, a BLUETOOTH chip 606, and an optics chip 614. Additional detail regarding the internal components of the writing device 600 is provided hereafter, after which detail regarding corresponding external components of the writing device 600 is also provided.

As mentioned, the writing device 600 includes an IMU 602. In particular, the IMU 602 includes one or more accelerometers, one or more gyroscopes, and/or one or more magnetometers. The IMU 602 gathers information relating to movement, tilt, and orientation of the writing device 600. To illustrate, the IMU 602 is configured to detect relative changes in position as well as speed of movement in a lateral direction or a vertical direction. The IMU 602 is further configured to detect changes in orientation is the writing device 600 spins or rotates, and is further configured to detect a rate of such changes (e.g., angular velocity). The IMU 602 is also configured to detect changes in tilt of the writing device 600 by detecting an angle at which the writing device 600 is leaning one direction or another. Accordingly, by communicating with the writing device 600 to collect information gathered by the IMU 602, the augmented reality composition system 110 monitors changes in position, tilt, and orientation of the writing device 600.

As also mentioned, the writing device 600 includes a pressure sensor chip 604. In particular, the pressure sensor chip 604 is configured to collect and process information relating to pressure applied to one or more pressure sensors of the writing device 600. For instance, the pressure sensor chip 604 gathers information indicating an amount of pressure applied to the pressure sensor 618 by way of the tip 616 of the writing device, and the pressure sensor chip 604 further gathers information indicating an amount of pressure and a timing of pressure applied to the pressure sensor 622 by way of the eraser 620 of the writing device 600. Thus, by communicating with the pressure sensor chip 604, the augmented reality composition system 110 determines pressure (and varying degrees or amounts of pressure) applied to the tip 616 of the writing device and/or the eraser 620 of the writing device.

The writing device 600 further includes a BLUETOOTH chip 606 configured to include or communicate with a BLUETOOTH antenna, and further configured to facilitate communications between the writing device 600 and an augmented reality device (e.g., augmented reality device 108). As described above, the augmented reality composition system 110 communicates with the writing device 600 to gather information from one or more components of the writing device 600. For example, the augmented reality composition system 110 gathers information from the IMU 602, the pressure sensor chip 604, and the optics chip 614. To facilitate such communication, the writing device 600 includes a BLUETOOTH chip 606 or an alternative communication device operable to transmit sensory information from the writing device 600 to an augmented reality device (e.g., augmented reality device 108) and/or to receive commands or other communications from the augmented reality device 108.

The writing device still further includes an optics chip 614 configured to process sensory information captured by way of an optical sensor (e.g., optical sensor 612). In particular, the optics chip 614 includes one or more processors and is configured to process changes in light to convert such changes into electrical signals indicating movement of the writing device 600. Indeed, in some embodiments the optical sensor 612 captures images one after another in succession as the writing device 600 moves along a writing surface. The optics chip 614 collects and processes the images to detect differences within the images, and from those differences, determines a direction and speed of the writing device 600. In other embodiments, the optical sensor 612 projects a light and captures a portion of the projected light that reflects off of the writing surface back to the optical sensor 612. In these embodiments, the optics chip 614 is configured to process the changes in reflected light to determine a direction and speed of movement of the writing device 600. In any case, the augmented reality composition system 110 communicates with the optics chip 614 to track movement of the writing device 600 by way of the optical sensor 612.

In addition to internal components such as integrated circuit components, the writing device 600 also includes external and/or non-circuit-based components such as reflective elements 608a and 608b, emitter 610, optical sensor 612, and pressure sensors 618 and 622. The reflective elements 608a and 608b reflect a specific wavelength of light such as, for example, infrared light. In these embodiments, the augmented reality device 108 includes an infrared camera (or other sensor configured to detect light of the specific wavelength reflected by the reflective elements 608a and 608b). By thus detecting light reflected off of the reflective elements 608a and 608b, the augmented reality composition system 110 may track movement of the writing device 600 in three dimensions, and may further calculate a tilt of the writing device 600 by determining a position of reflective element 608a relative to reflective element 608b and calculating a slope between them.

The reflective elements 608a and 608b may be separate from, and attached around, the housing 601. For example, in some embodiments the reflective elements 608a and 608b are infrared tape (e.g., tape that circumvents the housing 601). In other embodiments however, the reflective elements 608a and 608b are integrated within (e.g., a part of) the housing 601 and may be composed of the same material as the housing 601, but further include reflective dye or some other coloring element to reflect a specific range of wavelengths of light. Alternatively, the reflective elements 608a and 608b may each be a colored (e.g., painted) portion of the housing 601 where the coloring reflects the range of wavelengths of light.

As illustrated in FIG. 6A, the writing device 600 further includes an emitter 610. As described above, the emitter 610 is configured to project a visual indicator onto a real-world surface. As shown in FIG. 6A, the emitter 610 is affixed to the housing 601 at a location above the reflective element 608b. In some embodiments, however, the emitter 610 is affixed to the housing 601 at a location nearer to the tip 616 of the writing device (e.g., on the portion of the housing 601 that narrows to the tip 616). In other embodiments, the emitter 610 is affixed to the housing 601 at a location higher up on the housing 601 (e.g., halfway between the eraser 620 and the tip 616, adjacent to the reflect element 608a, etc.). In some embodiments, the emitter 610 is not affixed to the housing 601 but is instead integrated with (e.g., a part of) the housing 601 (e.g., a continuous piece of metal, plastic, or other material).

Continuing with FIG. 6A, the writing device 600 also includes an optical sensor 612. As mentioned, the optical sensor 612 is configured to capture images or reflected light to detect changes within the images/light such that the optics chip 614 can determine relative changes in position and rates of positional change from the changes in the images/light. While FIG. 6A depicts the optical sensor 612 located on the conical portion of the housing 601 that narrows to the tip 616, in some embodiments the optical sensor 612 is located within the tip 616, or else is located higher up on the housing 601. In any case, similar to the emitter 610, the optical sensor 612 may be affixed to the housing or else may be a part of the housing as a continuous piece of material.

As mentioned above, the writing device 600 further includes a tip 616 and a pressure sensor 618. The tip 616 is configured to depress into the end of the writing device 600 and contact the pressure sensor 618 in response to forces applied to the writing device 600 by the user 112. While in some embodiments the tip 616 may move freely (e.g., without tension or resistance) within the end of writing device 600, in other embodiments the tip 616 may include a mechanism (e.g., a spring, a pressure chamber, or simply a frictional fit within the end of the writing device 600) configured to apply tension or resistance to the tip 616. By adding resistance, the writing device 600 may be more tactilely accurate in replicating the sensation of writing or drawing with a traditional pen or pencil. Indeed, in some embodiments, the writing device 600 may adjust resistance of the tip 616 based on one or more settings of the augmented reality composition system 110—e.g., when a user 112 selects to write with a pen setting, the resistance may be different than when the user 112 selects to paint with a paintbrush setting.

While FIG. 6A illustrates one embodiment of the pressure sensor 618, this is merely exemplary. It will be appreciated that the pressure sensor 618 may be of any suitable shape or size, and it will be further appreciated that the pressure sensor 618 may be located nearer to or farther from the tip end of the writing device 600. Indeed, in some embodiments, the pressure sensor 618 may be an inductive sensor that circumscribes the tip 616 within the housing 601 and that detects changes in induction as the tip (e.g., a metal tip) passes through the circular pressure sensor 618 at varying depths or distances.

Furthermore, the writing device 600 includes an eraser 620 and a pressure sensor 622. Similar to the discussion of the tip 616 and the pressure sensor 618, the eraser 620 is configured to depress into the writing device 600 and contact the pressure sensor 622 with varying degrees of pressure. Additionally, although FIG. 6A illustrates a particular shape and configuration of the eraser 620 and the pressure sensor 622, in some embodiments the eraser 620 and the pressure sensor 622 may have different shapes and/or configurations. For example, the eraser 620 may be cylindrical without a protruding end shown in FIG. 6A such that the end of the eraser that is encased within the housing 601 contacts the pressure sensor 622 as the user 112 presses down to erase a digital mark or augmented reality object.

While FIG. 6A illustrates one example embodiment of the writing device 600, the writing device 600 may include additional or alternative configurations. For example, the writing device 600 may have a housing 601 of a different shape, as described above. Furthermore, the writing device 600 may include different configurations of the components described above. Indeed, FIG. 6B describes an alternative embodiment of a writing device 623 including various components.

As illustrated in FIG. 6B, the writing device 623 includes internal circuitry components similar to those described above with referent to FIG. 6A. For example, the writing device 623 includes therein an IMU 624, a pressure sensor chip 626, a BLUETOOTH chip 628, and an optics chip 630. Each of the IMU 624, the pressure sensor chip 626, the BLUETOOTH chip 628, and the optics chip 630 are configured as described above, and each is implemented by integrated circuits or other circuitry-based components within the writing device 623.

As further illustrated by FIG. 6B, the writing device 623 includes a housing 625. The housing 625 may include one or more components embedded. For example, the housing 625 may include an emitter 632 configured to project a visual indicator onto a writing surface. As discussed, by tracking the location of the visual indicator projected by the emitter 632, the augmented reality composition system 110 monitors the position and/or movement of the writing device 623. In contrast to an emitter that protrudes out from the housing 625, the emitter 632 is flush with the housing 625 or else inset within the housing 625. While FIG. 6B illustrates the emitter 632 located in one particular location within the housing 625, in other embodiments the emitter 632 may be located in alternative locations, such as nearer to the tip 636 of the writing device 623.

FIG. 6B further illustrates a reflective element 634. As described above, the reflective element 634 is configured to reflect a range of light wavelengths. In contrast to FIG. 6A, the writing device 623 of FIG. 6B includes a single reflective element 634 located near the center of the housing 625 of the writing device 623. While FIG. 6B illustrates a particular size of the reflective element 634, in some embodiments the reflective element 634 may be larger or smaller. Additionally, the reflective element 634 may be located in alternative locations on the housing 625 (or as part of the housing 625, as described in relation to FIG. 6A).

The writing device 623 further includes a tip 636 configured to contact a pressure sensor 638, as described above. Additionally, the tip 636 may include an optical sensor 640 located therein. The optical sensor 640 is configured to detect changes in light or images, as described above. By including the optical sensor 640 within the tip 636, the writing device 623 may more accurately track changes in position because the optical device 640 is closer to a given writing surface.

As further illustrated in FIG. 6B, the writing device 623 includes an eraser 642 and a pressure sensor 644. The eraser 642 and the pressure sensor 644 are configured as similarly described above in relation to FIG. 6A. For example, the eraser 642 is configured to depress into the back end of the housing 625 to contact the pressure sensor 644 with varying degrees of pressure. Additionally, the eraser 642 may be different shape than the eraser 642 illustrated in FIG. 6B. For example, the eraser 642 may be entirely cylindrical and may not include a nub, as described above.

Although FIGS. 6A-6B illustrate example embodiments of writing devices 600 and 623, respectively, it will be understood from the disclosure herein that, in some embodiments, writing device 600 includes more or fewer components than those depicted in FIG. 6A, and likewise, writing device 623 includes more or fewer components than those depicted in FIG. 6B. In addition, the writing devices 600 and 623 may also include alternative or additional arrangements of the components depicted in FIGS. 6A and 6B, respectively. For example, as described above, the writing device 623 of FIG. 6B may include a reflective element 634 that does not entirely circumscribe the housing 625 but instead includes a gap, or else includes a specific pattern, at one or more locations. By including gaps or patterns at known locations, the augmented reality composition system 110 may determine an orientation of the writing device 623 via the reflective element 634 based on portions of the reflective element 634 that are visible to the augmented reality device 108.

Although FIGS. 6A-6B illustrate example embodiments of writing devices, a writing device may include additional or alternative arrangements of components to those illustrated in FIGS. 6A-6B. For example, in some embodiments a writing device includes an emitter 610 and an optical sensor 612, but does not include reflective elements 608. In other embodiments, the writing device includes reflective elements 608 and the optical sensor 612, but does not include the emitter 610. In one or more embodiments, the writing device includes multiple emitters. In any case, the writing device 106 described in the various embodiments 106a-106d of FIGS. 6A-6B may include any combination of the components and features described herein.

Figure 7:
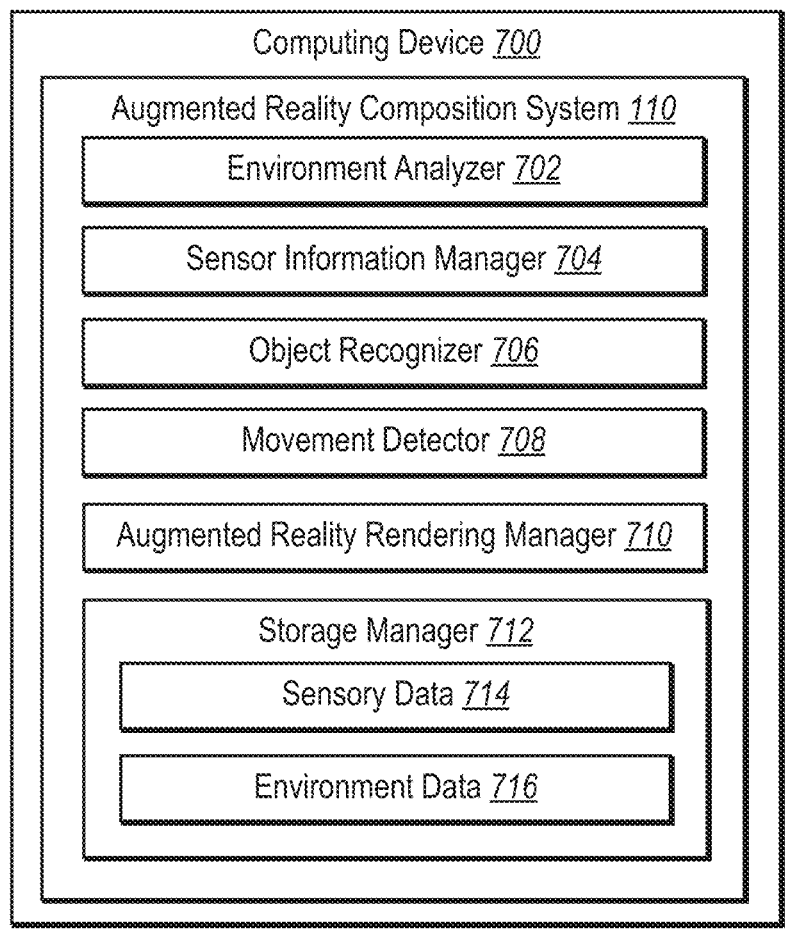
FIG. 7 illustrates an example schematic diagram of an augmented reality composition system in accordance with one or more embodiments.

Looking now to FIG. 7, additional detail will be provided regarding components and capabilities of the augmented reality composition system 110. Specifically, FIG. 7 illustrates an example schematic diagram of the augmented reality composition system 110 on an example computing device 700 (e.g., the augmented reality device 108, the writing device 106, and/or the server(s) 102). As shown in FIG. 7, the augmented reality composition system 110 may include an environment analyzer 702, a sensor information manager 704, an object recognizer 706, a movement detector 708, an augmented reality rendering manager 710, and a storage manager 712. While FIG. 7 depicts a particular number of components, in some embodiments, the augmented reality composition system 110 may include more or fewer components. In addition, the components may perform additional or alternative tasks than those described hereafter.

As illustrated in FIG. 7, the augmented reality composition system 110 includes an environment analyzer 702. In particular, the environment analyzer 702 examines, scans, evaluates, recognizes, parses, or otherwise analyzes a real-world environment. For example, the environment analyzer 702 analyzes a view of a real-world environment that is visible through an augmented reality device 108 to identify real-world surfaces within the real world that are acceptable and/or unacceptable for composing, as described above. Additionally, the environment analyzer 702 communicates with the augmented reality rendering manager 710 to render indicators, overlays, etc., to designate the real-world surfaces as acceptable or not within an augmented reality environment presented to the user 112 by way of the augmented reality device 108.

In addition, the augmented reality composition system 110 of FIG. 7 includes a sensor information manager 704. In particular, the sensor information manager 704 collects, gathers, transmits, reads, analyzes, extrapolates, and/or interprets sensory information. For example, the sensor information manager 704 collects information by way of a writing device 106 pertaining to a pressure sensor input. The sensor information manager 704 further gathers sensory information by way of an augmented reality device 108 in response to detecting one or more reflective elements (e.g., reflective elements 608) on the writing device 106 by way of a camera or other sensor. Additionally, the sensor information manager 704 receives information from the writing device 106 corresponding to IMU data associated with a tilt and/or movement of the writing device 106. The sensor information manager 704 also gathers information by way of an augmented reality device 108 by recognizing a location of a visual indicator projected by an emitter (e.g., emitter 610) associated with the writing device 106. The sensor manager 704 may also or alternatively collect sensory information from the writing device relating to the optical sensor (e.g., optical sensor 612) as the writing device 106 moves on a surface.

The sensor information manager 704 communicates with the movement detector 708 to determine whether the location of the writing device 106 is constant or changing. For instance, in response to collecting sensory information pertaining to a location of a visual indicator at a first location and subsequently collecting sensory information pertaining to a second location of the visual indicator, the movement detector 708 may determine that the writing device 106 is moving.

As further illustrated in FIG. 7, the augmented reality composition system 110 may include an object recognizer 706. In particular, the object recognizer 706 may communicate with the sensor information manager 704 relating to information of reflective elements, an optical sensor, an emitter, etc., to recognize the writing device 106. In some embodiments, the object recognizer 706 may analyze the view of the augmented reality device 108 and perform object recognition techniques as described herein to identify the writing device 106. Similarly, the object recognizer may perform spatial recognition algorithms to identify real-world surfaces and to further determine which of the real-world surfaces are acceptable for composing and which are not.

As illustrated in FIG. 7, the augmented reality composition system 110 may also include a movement detector 708. The movement detector 708 may communicate with the object recognizer 706 and/or the sensor information manager 704 to detect movement of the writing device 106. In addition, the movement detector 708 can detect an initial position of the writing device 106 in accordance with the methods described herein.

As further illustrated in FIG. 7, the augmented reality composition system 110 may include an augmented reality rendering manager 710. In particular, the augmented reality rendering manager 710 may communicate with the object recognizer 706 and the movement detector 708 to generate an augmented reality environment as described herein. Additionally, the augmented reality rendering manager 710 may generate augmented reality objects within the augmented reality environment for presentation to the user 112. The augmented reality objects correspond to movement detected by the movement detector 708, as described in further detail above.

As mentioned, the augmented reality composition system 110 of FIG. 7 further includes a storage manager 712. The storage manager 712 may include sensory data 714 and environment data 716. In particular, the storage manager 712 may communicate with the sensor information manager 704 to collect and store sensory data 714 pertaining to the components and features of the writing device described herein. Additionally, the storage manager 712 may communicate with the environment analyzer 702 to store information (e.g., three-dimensional coordinates, size, etc.) pertaining to the real-world environment that the augmented reality composition system 110 analyzes. By storing the environment data 716, the augmented reality composition system 110 can remember previous surfaces, augmented reality objects, etc., for areas that are not currently within the view of the augmented reality device 108, as discussed above.

FIGS. 1-7, the corresponding text, and the examples provide a number of different systems and methods that generate augmented reality objects based on tracking movement of a writing device. In addition to the foregoing, embodiments can also be described in terms of flowcharts comprising acts in a method for accomplishing a particular result. For example, FIG. 8 illustrates a flowchart of an exemplary method in accordance with one or more embodiments.

Figure 8:
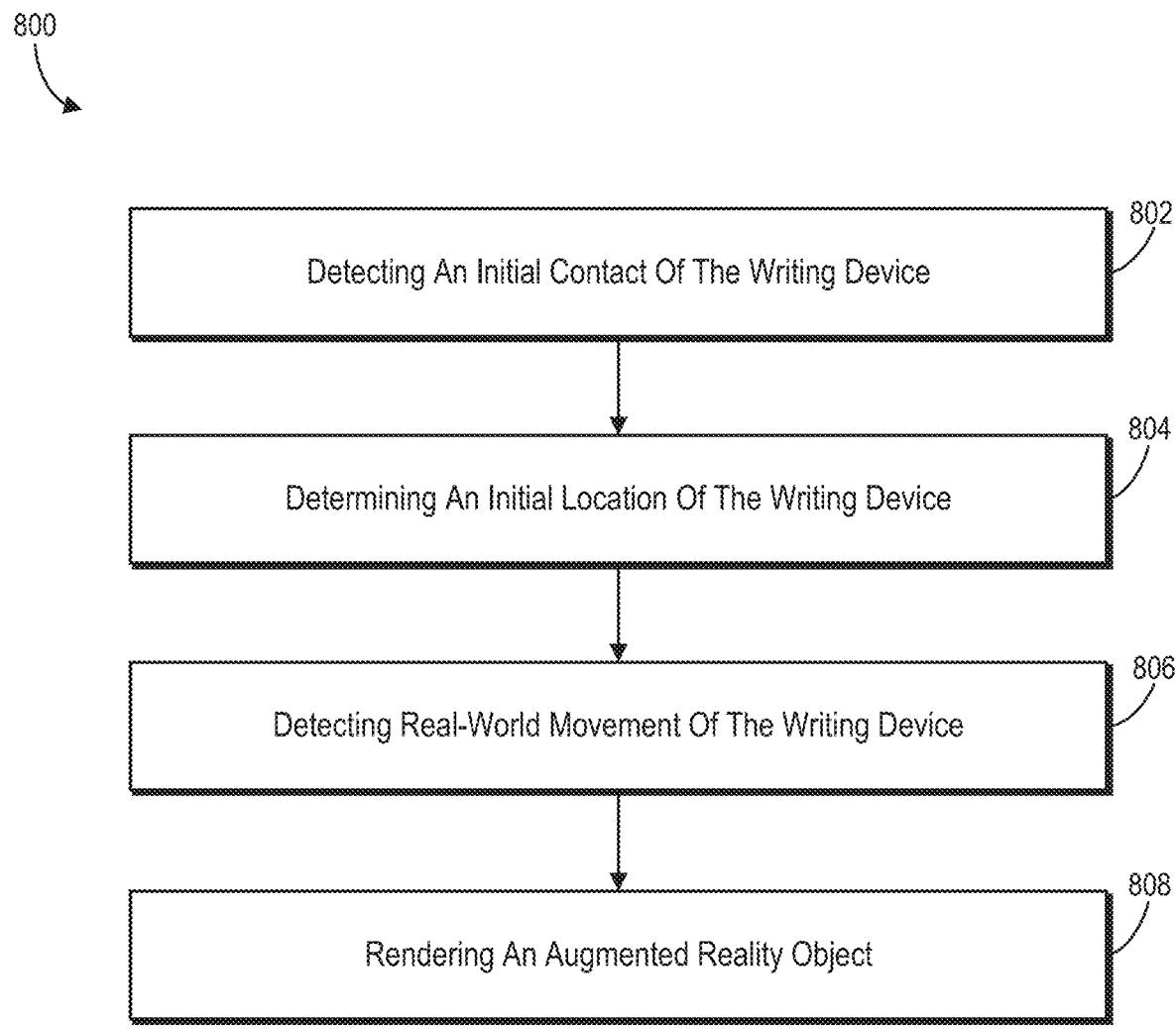
FIG. 8 illustrates a flowchart of a series of acts in a method for rendering an augmented reality object in accordance with one or more embodiments.

While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the steps/acts described herein may be repeated or performed in parallel with one another or in parallel with different instances of the same or other similar steps/acts.

FIG. 8 illustrates an exemplary method (or series of acts) 800 of rendering an augmented reality object based on tracking movement of a writing device. The method 800 includes an act 802 of detecting an initial contact of the writing device. In particular, the act 802 can involve detecting, by way of a pressure sensor of a writing device, an initial contact of the writing device with a real-world surface.

The method 800 of FIG. 8 also includes an act 804 of determining an initial location of the writing device. In particular, the act 804 can involve determining, in response to the detected initial contact and by way of a locator element associated with the writing device, an initial location of the writing device. In some embodiments, the locator element can include one or more of: a reflective element operable to reflect a range of light wavelengths measurable by the augmented reality device, an emitter operable to project a visual indicator onto the real-world surface, or a shape of the writing device recognizable by the augmented reality device.

In addition, the method 800 includes an act 806 of detecting real-world movement of the writing device. In particular, the act 806 can involve detecting, by way of a motion detector element associated with the writing device, real-world movement of the writing device relative to the initial location. In some embodiments, the motion detector element can include one or more of: a reflective element operable to reflect a range of light wavelengths measurable by the augmented reality device, an emitter operable to project a visual indicator onto the real-world surface, a shape of the writing device recognizable by the augmented reality device, an optical sensor operable to detect light deflection of a light emitted by the writing device off of the real-world surface, or an inertial measurement unit.

As further illustrated by FIG. 8, the method 800 includes an act 808 of rendering an augmented reality object. In particular, the act 808 can include rendering, by way of an augmented reality device and based on the detected real-world movement of the writing device, an augmented reality object such that the augmented reality object appears to be drawn on the real-world surface. Rendering the augmented reality object can include detecting, by way of the pressure sensor associated with the writing device, that the writing device is contacting the real-world surface, and generating, by way of the augmented reality device and in response to detecting that the writing device is contacting the real-world surface, a digital mark that appears to be drawn on the real-world surface and that follows the detected real-world movement of the writing device.

Though not illustrated in FIG. 8, the method 800 may further include an act of analyzing, by way of the augmented reality device, a real-world environment to identify at least one real-world surface acceptable for composing. In addition, the method 800 may include an act of providing, by way of the augmented reality device and in response to analyzing the at least one real-world surface, an indication that the at least one real-world surface is acceptable for composing. Furthermore, the method 800 can include acts of determining that the real-world movement of the writing device is above a speed threshold, determining, in response to determining that the real-world movement is above the speed threshold, the real-world movement of the writing device based on a first motion detector element, and, in response to determining that the real-world movement is no longer above the speed threshold, determining the real-world movement of the writing device based on a second motion detector element.

Furthermore, the method 800 can include an act of detecting, by way of the pressure sensor associated with the writing device, a pressure force applied to the writing device, as well as an act of detecting, by way of an inertial measurement unit associated with the writing device, a tilt of the writing device. The method 800 may also include an act of adjusting a weight of the digital mark generated by way of the augmented reality device based on the detected pressure force applied to the writing device and the detected tilt of the writing device. Furthermore, the method 800 may include an act of generating, based on the rendered augmented reality object, a three-dimensional augmented reality model corresponding to the augmented reality object, wherein the three-dimensional augmented reality model is manipulable by a user within a three-dimensional augmented reality environment.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
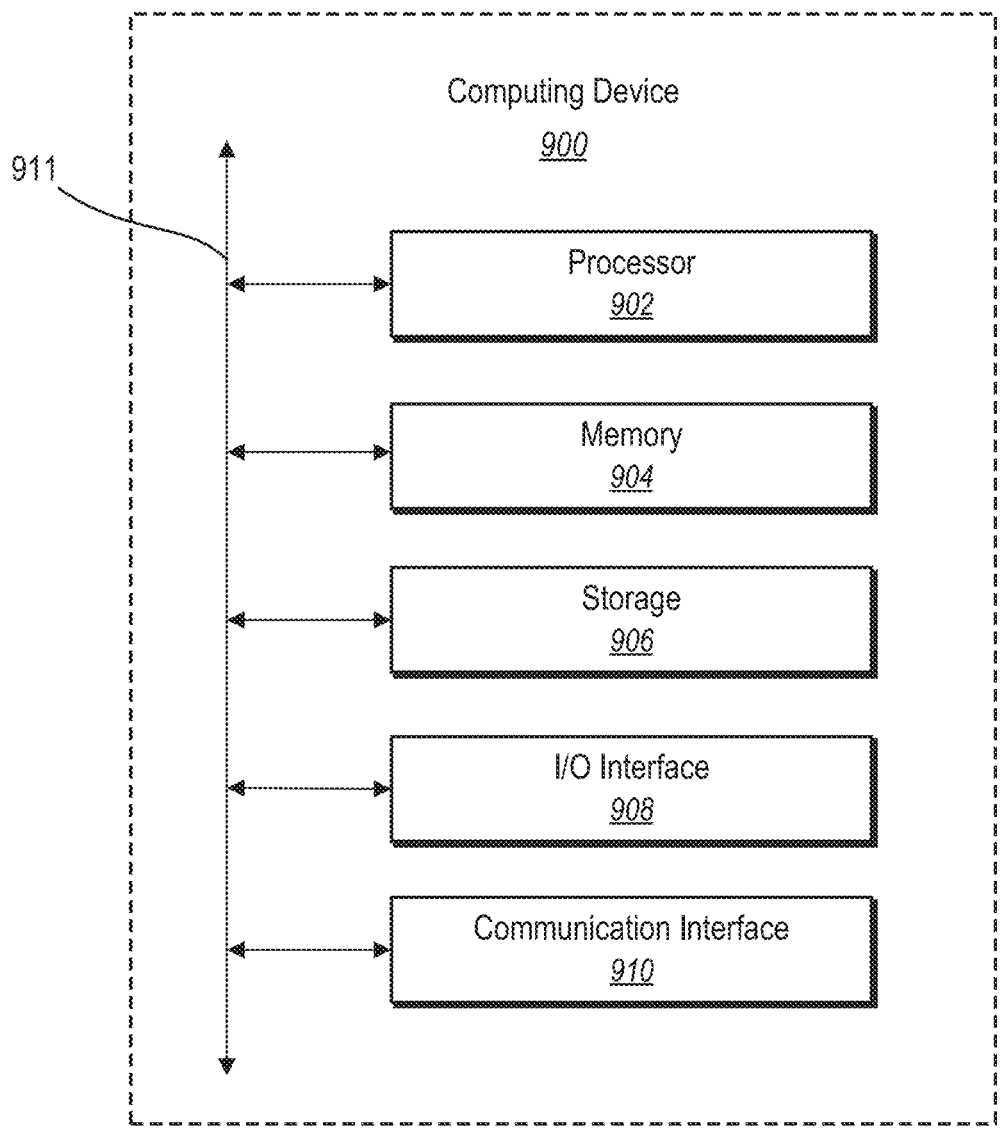
FIG. 9 illustrates a block diagram of an example computing device in accordance with one or more embodiments.

FIG. 9 illustrates, in block diagram form, an exemplary computing device 900 that may be configured to perform one or more of the processes described above. One will appreciate that the augmented reality composition system 110 can comprise implementations of the computing device 900. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive (HDD), flash memory, a Universal Serial Bus (USB) drive or a combination of these or other storage devices.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a writing device or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 911. The bus 911 can comprise hardware, software, or both that couples components of computing device 900 to each other.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for generating augmented reality objects using a digital writing device, a computer-implemented method for creating a digital object in an augmented reality environment corresponding to a real-world surface, the computer-implemented method comprising:
  determining an initial location of a writing device on a real-world surface;
  detecting real-world movement of the writing device relative to the initial location by:
    determining that the real-world movement of the writing device is above a speed threshold;
    in response to determining that the real-world movement is above the speed threshold, determining the real-world movement of the writing device based on a first combination of two or more tracking techniques; and
    in response to determining that the real-world movement is at or below the speed threshold, determining the real-world movement of the writing device based on a second combination of two or more tracking techniques; and
  rendering, within an augmented reality environment generated by way of an augmented reality device, an augmented reality object that appears to be drawn on the real-world surface based on the real-world movement of the writing device.

2. The computer-implemented method of claim 1, wherein the two or more tracking techniques comprise two or more of:
  tracking real-world movement of a reflective element located on the writing device;
  utilizing an emitter associated with the writing device to track real-world movement;
  tracking real-world movement utilizing an optical sensor located on the writing device;
  utilizing an inertial measurement unit to track real-world movement of the writing device;
  utilizing an object recognition technique to track real-world movement of the writing device; or
  implementing a machine learning model to track real-world movement of the writing device.

3. The computer-implemented method of claim 1, further comprising:

analyzing, by way of the augmented reality device, a plurality of real-world surfaces within a real-world environment to identify, from the plurality of real-world surfaces, the real-world surface as sufficiently large and sufficiently flat for composing; and providing, within the augmented reality environment and in response to identifying the real-world surface as sufficiently large and sufficiently flat for composing, a visual indication that the real-world surface is acceptable for composing.

4. The computer-implemented method of claim 3, further comprising:

identifying, from the plurality of real-world surfaces, one or more real-world surfaces that are unacceptable for composing; and providing, within the augmented reality environment and in response to identifying the one or more real-world surfaces as unacceptable for composing, a visual indication that the one or more real-world surfaces are unacceptable for composing.

5. The computer-implemented method of claim 1, further comprising:

determining environmental factors associated with tracking the writing device; and utilizing the two or more tracking techniques based on the environmental factors.

6. The computer-implemented method of claim 5, wherein determining the environmental factors comprises one or more of determining a reflectiveness of the real-world surface or detecting lighting conditions associated with the augmented reality environment.

7. The computer-implemented method of claim 1, wherein rendering the augmented reality object comprises:

detecting, by way of a pressure sensor associated with the writing device, that the writing device is contacting the real-world surface; and generating, within the augmented reality environment and in response to detecting that the writing device is contacting the real-world surface, a digital mark that appears to be drawn on the real-world surface and that follows the real-world movement of the writing device.

8. The computer-implemented method of claim 7, further comprising:

detecting, by way of the pressure sensor associated with the writing device, a pressure force applied to the writing device;

detecting, by way of an inertial measurement unit associated with the writing device, a tilt of the writing device; and adjusting a compositional attribute of the digital mark based on the pressure force applied to the writing device and the tilt of the writing device.

9. A system comprising:

at least one processor; and a non-transitory computer readable medium comprising instructions that, when executed by the at least one processor, cause the system to:

determine an initial location of a writing device on a real-world surface by detecting a locator element associated with the writing device in response to receiving an indication of an initial contact of the writing device on the real-world surface;

detect real-world movement of the writing device relative to the initial location by:

determining that the real-world movement of the writing device is above a speed threshold;

in response to determining that the real-world movement is above the speed threshold, determining the real-world movement of the writing device based on a first combination of two or more tracking techniques; and in response to determining that the real-world movement is at or below the speed threshold, determining the real-world movement of the writing device based on a second combination of two or more tracking techniques; and render, within an augmented reality environment generated by way of an augmented reality device, an augmented reality object that appears to be drawn on the real-world surface based on the real-world movement of the writing device.

10. The system of claim 9, wherein the two or more tracking techniques comprise two or more of:

tracking real-world movement of a reflective element located on the writing device;

utilizing an emitter associated with the writing device to track real-world movement;

tracking real-world movement utilizing an optical sensor located on the writing device;

utilizing an inertial measurement unit to track real-world movement of the writing device;

utilizing an object recognition technique to track real-world movement of the writing device; or implementing a machine learning model to track real-world movement of the writing device.

11. The system of claim 9, further comprising instructions that, when executed by the at least one processor, cause the system to analyze, by way of the augmented reality device, a real-world environment to identify at least one real-world surface that is sufficiently large and sufficiently flat for composing.

12. The system of claim 11, further comprising instructions that, when executed by the at least one processor, cause the system to provide, within the augmented reality environment and in response to analyzing the at least one real-world surface, an indication that the at least one real-world surface is acceptable for composing.

13. The system of claim 12, further comprising instructions that, when executed by the at least one processor, cause the system to:

identify, from a plurality of real-world surfaces, one or more real-world surfaces that are unacceptable for composing; and provide, within the augmented reality environment and in response to identifying the one or more real-world surfaces as unacceptable for composing, a visual indication that the one or more real-world surfaces are unacceptable for composing.

14. The system of claim 9, further comprising instructions that, when executed by the at least one process, cause the system to:

determine environmental factors associated with tracking the writing device; and utilize the two or more tracking techniques based on the environmental factors.

15. The system of claim 9, wherein the instructions cause the system to determine the initial location of the writing device by detecting, by way of a pressure sensor of the writing device, an initial contact of the writing device with the real-world surface.

16. The system of claim 9, wherein the instructions cause the system to render the augmented reality object by:

detecting, by way of a pressure sensor associated with the writing device, that the writing device is contacting the real-world surface; and generating, within the augmented reality environment and in response to detecting that the writing device is contacting the real-world surface, a digital mark that appears to be drawn on the real-world surface and that follows the real-world movement of the writing device.

17. A non-transitory computer readable medium comprising instructions that, when executed by at least one processor, cause a computing device to:

determine an initial location of a writing device on a real-world surface;

detect real-world movement of the writing device relative to the initial location by:

determining that the real-world movement of the writing device is above a speed threshold;

in response to determining that the real-world movement is above the speed threshold, determining the real-world movement of the writing device based on a first combination of two or more tracking techniques; and in response to determining that the real-world movement is at or below the speed threshold, determining the real-world movement of the writing device based on a second combination of two or more tracking techniques; and render, within an augmented reality environment generated by way of an augmented reality device, an augmented reality object that appears to be drawn on the real-world surface based on the real-world movement of the writing device.

18. The non-transitory computer readable medium of claim 17, wherein the two or more tracking techniques comprise two or more of:

tracking real-world movement of a reflective element located on the writing device;

utilizing an emitter associated with the writing device to track real-world movement;

tracking real-world movement utilizing an optical sensor located on the writing device;

utilizing an inertial measurement unit to track real-world movement of the writing device;

utilizing an object recognition technique to track real-world movement of the writing device; or implementing a machine learning model to track real-world movement of the writing device.

19. The non-transitory computer readable medium of claim 17, further comprising instructions that, when executed by the at least one processor, cause the computing device to:

analyze, by way of the augmented reality device, a plurality of real-world surfaces within a real-world environment to identify, from the plurality of real-world surfaces, the real-world surface as sufficiently large and sufficiently flat for composing; and provide, within the augmented reality environment and in response to identifying the real-world surface as sufficiently large and sufficiently flat for composing, a visual indication that the real-world surface is acceptable for composing.

20. The non-transitory computer readable medium of claim 19, further comprising instructions that, when executed by the at least one processor, cause the computing device to:

identify, from the plurality of real-world surfaces, one or more real-world surfaces that are unacceptable for composing; and provide, within the augmented reality environment and in response to identifying the one or more real-world surfaces as unacceptable for composing, a visual indication that the one or more real-world surfaces are unacceptable for composing.

* * * * *